(12) United States Patent
Kindo et al.

(10) Patent No.: US 6,286,012 B1
(45) Date of Patent: Sep. 4, 2001

(54) INFORMATION FILTERING APPARATUS AND INFORMATION FILTERING METHOD

(75) Inventors: Toshiki Kindo, Yokohama; Hideyuki Yoshida; Taisuke Watanabe, both of Sagamihara, all of (JP)

(73) Assignee: Matsushita Research Institute Tokyo, Inc., Kanagawa (JP)

( * ) Notice: Subject to any disclaimer, the term of this patent is extended or adjusted under 35 U.S.C. 154(b) by 0 days.

(21) Appl. No.: 09/431,232

(22) Filed: Nov. 1, 1999

(30) Foreign Application Priority Data

Nov. 2, 1998 (JP) .................................................. 10-312417

(51) Int. Cl.[7] .................................................. G06F 17/30
(52) U.S. Cl. .............................. 707/104; 707/9; 709/222; 709/218
(58) Field of Search ..................... 707/9, 104; 709/218, 709/222

(56) References Cited

U.S. PATENT DOCUMENTS 6,076,082 * 6/2000 Kindo ...................................... 706/12
6,078,916 * 6/2000 Culliss ...................................... 707/5

OTHER PUBLICATIONS

Kindo et al., Adaptive Personal Information Filtering System That Organizes Personal Profiles Automatically, IJCAI–97, v. 1, pp. 716–721, Aug. 23, 1997.*
Yoshida et al., "A Newspaper Reading Out System with an Adaptive Information Filtering Technology to Support Visually Impaired People," IEEE, 1999, p. 38–41.*
Meki et la., "Competitive Model To Classify Unknown Data Into Hierarchical Clusters Through Unsupervised Learning," IEEE, 1997, p. 815–818.*
English language abstract of JP 9–288683.

* cited by examiner

Primary Examiner—Thomas Black
Assistant Examiner—Charles L. Rones
(74) Attorney, Agent, or Firm—Greenblum & Bernstein, P.L.C.

(57) ABSTRACT

The information filtering apparatus has a configuration having a metric dividing section which divides a matrix indicating that what items a user needed and did not need into a plurality of matrixes, and a classification information filtering unit which calculates a plurality of classification necessities and a plurality of classification reliabilities using the plurality of matrixes divided in the metric dividing section.

17 Claims, 15 Drawing Sheets

INFORMATION FILTERING APPARATUS AND INFORMATION FILTERING METHOD

BACKGROUND OF THE INVENTION

1. Field of the Invention

The present invention relates to an information filtering apparatus and information filtering method for facilitating acquisition of necessary information from a storage using a magnetic, optical medium or the like and an information communication network.

2. Description of the Related Art

With progress of social infrastructure in recent information communications, it is desired greatly that an information filtering apparatus be achieved as a technology of supporting enlarged information communication networks and remarkable increases of an communication amount. As the background thereof, it is considered that the information amount which a person can access is greater than that the person can process. Therefore, the information which the person needs often lies buried in a great amount of information.

As a conventional technology relating to the information filtering apparatus, there is a key word logical expression used in, for example, patent search. That is, patents of several hundreds of thousands to several millions are subjected to filtering with the key word logical expression.

However, some problems have been pointed out in the conventional method using the key word logical expression. First, since it is necessary for a user to set a logical expression for a key word with high accuracy, the user needs to adequately recognize characteristics of a filed data group (for example, under what condition the key word of the data is determined) or a structure of a system (for example, whether or not the key word is the system with thesaurus system) to obtain fine retrieval. Secondly, the result obtained by the information filtering is only appraised as matching with the logical expression for the key word. Such a result only matches with the key word, and sometimes is different from the content that the user requires. Alternately, it is not easy for the user to acquire the information with high priority for the user in descending order of priority from among such many retrieval results.

Based on the forgoing, the inventors of the present invention developed an information filtering apparatus for enabling acquisition of filtered result information which is really necessary to the user with high accuracy. This information filtering apparatus is disclosed in Japanese Unexamined Patent Publication HEI9-288683.

The information filtering apparatus described in the above Japanese Patent Publication is explained with FIG. 1. The information filtering apparatus is provided with information filtering unit 1 which subjects an input item to filtering, learning unit 2 which generates necessary information for the information filtering by learning, and interface unit 3 which indicates the filtered item on a display.

Information filtering unit 1 converts a plurality of key words contained in an item into a vector using a code dictionary stored in code dictionary storage section 4. The information filtering unit 1 further calculates a score using the vector. For the score calculation, the positive metric and negative metric for a key word signal are respectively fetched from positive metric storage section 5 and negative metric storage section 6. The necessity and reliability are calculated from the calculated score and a parameter stored in determination parameter storage section 7.

When the necessity and reliability for the input item are thus obtained, the unread data items stored in unread data storage section 8 are rearranged in order of necessity. Interface unit 3 presents the items in descending order of necessity, while obtaining a user evaluation whether the presented item is necessary or necessary. Learning unit 2 modifies the contents of storage sections 4 to 7 for storing the matrixes for use in the score calculation using the user evaluation and the plurality of key words.

There is however a problem that the information filtering apparatus described above cannot divide items for each field thereof to present when user's interests include a plurality of fields.

SUMMARY OF THE INVENTION

An object of the present invention is to provide an information filtering apparatus and information filtering method capable of changing an ordering manner for the order of presenting items and dividing the items to be presented for each field thereof to present when predetermined items are acquired from a storage using a magnetic or optical medium and an information communication network.

In order to achieve the above object, the information filtering apparatus has a configuration having a metric dividing section which divides a matrix indicating that what item a user needed and did not need into a plurality of matrixes, and a classification filtering unit which calculates a plurality of classification necessities and a plurality of classification reliabilities using the plurality of matrixes divided in the metric dividing section.

According to such a configuration, it is possible to convert a plurality of key words which is a signal that is not defined as a distance into a vector expression that is defined as a distance using a metric in which the degree of necessity for the user is reflected, thereby to quantify the degree of necessity for the user. As a result, the user can obtain items in descending order of necessity, in particular, can obtain items in descending order of necessity for each of a plurality of classifications.

The first scope of the present invention is provided with a metric storage in which a determination result of necessary or unnecessary for a presented item is stored in the form of a metric signal calculated from a key word signal contained in the item, the metric dividing section which fetches the metric signal from the metric storage, and dividing the metric signal for each predicted interested field to generate a classification metric signal, a classification filtering section which rearranges the order of presenting input items which are input from a storage using a magnetic or optical medium, or an information communication network, using a divided metric signal, and a presentation section which presents the items for each interested field according to the rearranged order of presenting items. The first scope thereby has effects of classifying items using an input indicative of evaluation of necessary or unnecessary from the user to perform rearrangement of the items, and of presenting the items in descending order of necessity for the user.

The second scope of the present invention is to divide the metric signal, which is calculated from a key word signal contained in a presented item so as to indicate a determination result of necessary or unnecessary for the presented item, for each predicted interested field to generate a classification metric signal, and rearrange the order of presenting input items which are input from a storage using a magnetic or optical medium, or an information communication network, using a divided metric signal, and present the items for each interested field according to the rearranged order, thereby providing effects of classifying items and rearranging the items in order of necessity for the user with high accuracy.

The third scope of the present invention is a database restructuring method for restructuring a database using the information filtering method of the second scope, thereby providing an effect of enabling the user to acquire necessary items readily.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

An embodiments of the present invention is explained below with reference to accompanying drawings.

Figure 2:
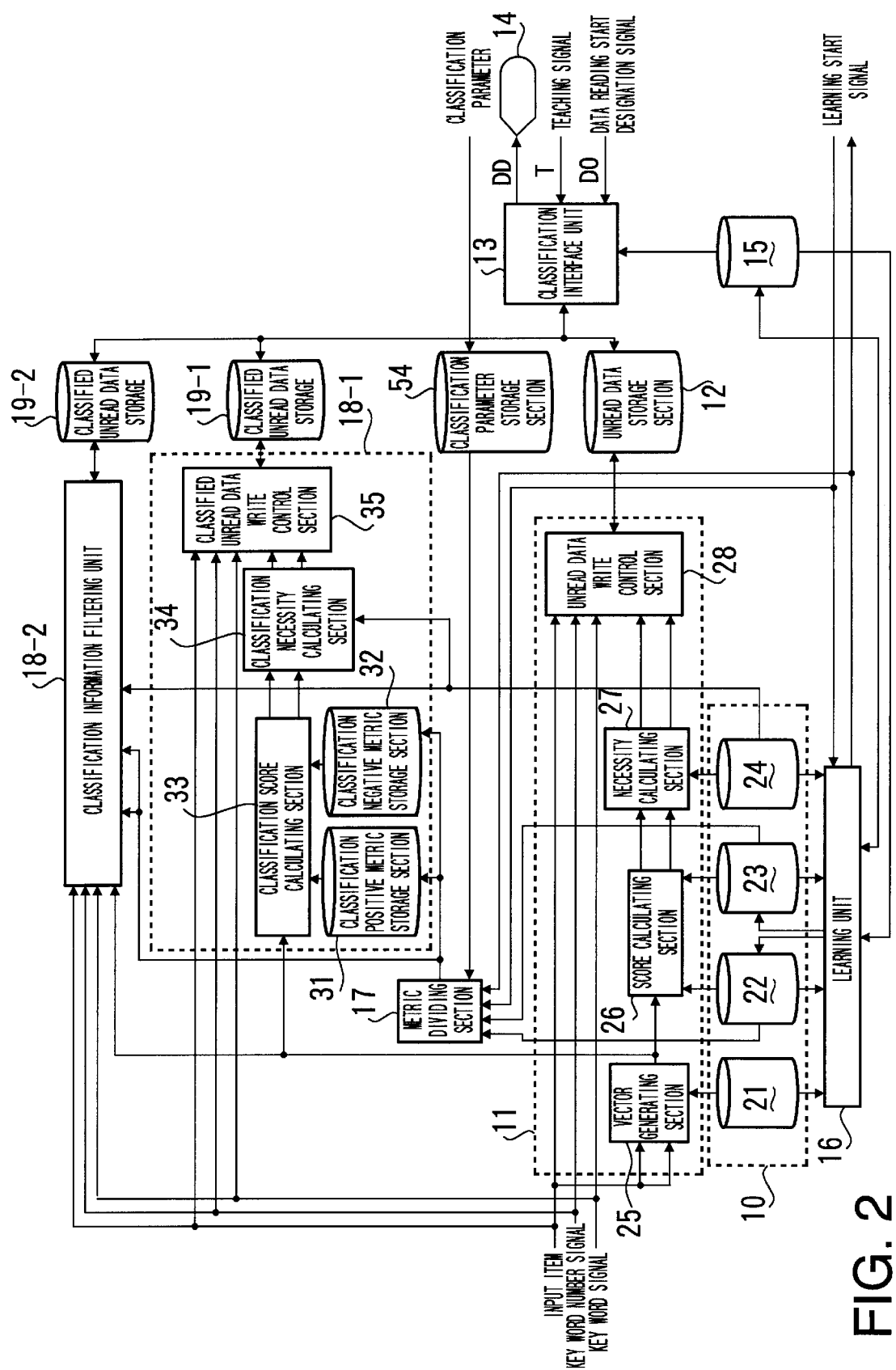
FIG. 2 is a block diagram of an information filtering apparatus according to an embodiment of the present invention.

FIG. 2 illustrates a configuration of an information filtering apparatus according to the embodiment of the present invention. In the information filtering apparatus, history data storage unit 10 stores history data that what items user needed previously, and information filtering unit 11 executes filtering of input items using the history data in history data storage unit 10. Unread items (items which a user has not read) subjected to the filtering by information filtering unit 11 are rearranged corresponding to the degree of necessity for the user and stored in unread data storage section 12. Classification interface unit 13 displays the items stored in unread data storage section 12, for example using a display, so that the user can watch the unread items. 14 denotes a display device.

Further, learning on the history about what item the user needed is performed using a teaching signal. The teaching signal indicative of the user evaluation on items which the user actually read is input from classification interface unit 13 and stored in teaching data storage section 15. Learning on the history about what item the user needed is performed by learning unit 16. Learning unit 16 updates the history data in history data storage unit 10 based on the teaching signal stored in teaching data storage section 15.

Furthermore, this embodiment is provided with some function blocks to separate items for each field to present. Metric dividing unit 17 divides positive metric signals and negative metric signals, which will be described later, among history data stored in history data storage unit 10 into a plurality of history data items. A plurality of (two in this embodiment) classification information filtering units 18-1 and 18-2 performs the filtering of items using the history data items divided by metric dividing unit 17, and predicts the necessity and reliability of each item for the user. The items which are rearranged according to the predicted results of the necessity and reliability are stored in classified unread data storage sections 19-1 and 19-2. The items which are stored in classified unread data sections 19-1 and 19-2 are presented to the user through classification interface unit 13.

The contents of operations in the information filtering apparatus of this embodiment configured as described above is explained below. First, the schematic operations in the information filtering apparatus are explained.

In addition, it is assumed that the history about what item the user needed previously is already learned. It is further assumed that the item has at least one key word associated with the item. The key word may be a portion or the whole of each word composing the item, or a special word which is made to represent the item.

When an item is newly input to information filtering unit 11, information filtering unit 11 reads out the previous user history data related to the key word included in the item from history data storage unit 10, and evaluates the necessity of the input item quantitatively in the form of a necessity signal. Similarly, a plurality of classification information filtering units 18-1 and 18-2 evaluates the necessity of the input item quantitatively in the form of a necessity signal using the classification metric signal.

The input item evaluated in each of filtering units 11, 18-1 and 18-2 are respectively stored in unread data storage section 12, and classified unread data storage sections 19-1 and 19-2. At this point, the write of the input item is controlled so that necessity signals thereof, including those of previous unread items, which are respectively calculated by information filtering unit 11 and each of classification information filtering units 18-1 and 18-2 are arranged in descending order of level.

Then, when the user requests, classification interface unit 13 presents the unread items including the newly input item one by one in descending order of necessity signal level (for example, on a display).

At this point, the user inputs a teaching signal through classification interface unit 13. The teaching signal indicates whether each of the unread items including the newly input item, which are presented for the user, is necessary or unnecessary to the user. Classification interface unit 13 receives the teaching signal and outputs the item and the teaching signal thereof to learning unit 16.

In addition, the input of the teaching signal by the user is performed in order to further increase a learning capability of learning unit 16. When the learning capability (learning capability of history that what item the user needed previously) of learning unit 16 is already adequately high, it is not necessary to perform the input.

Next, learning unit 16 rewrites the contents of history in history data storage unit 10 using the presented item and the teaching signal thereof. Thus, the information filtering apparatus according to this embodiment is adapted for the user by performing higher learning, and can classify the items which the user requires to present preferentially.

At the initial state that the learning is not performed, since learning unit 16 does not know about what item the user needs, it is necessary for the user to input the teaching signal as described above whenever the user receives the presentations of all the newly input items by classification interface unit 13. The information filtering apparatus becomes adapted for the user by the learning performed at any times, and can classify the items which the user requires and then present such items preferentially.

A specific example is described to explain the preferential presentation of the items which the user requires. It is premised that if the user obtains a retrieval set B of some information by retrieving a population A of a database of the information with a specific key word, the user does not always need all the items of the retrieval set B, or if the user needs all the items, the user absolutely has the necessity priority. Therefore, the preferential presentation of the items which the user requires means that such items are presented to the user in order of necessary to unnecessary or in order of necessity by classification interface unit 13.

On the other hand, metric dividing unit 17 divides a positive metric signal MY and a negative metric signal MN into a plurality of signals (two in this embodiment) to write in classification information filtering units 18-1 and 18-2. Classification information filtering units 18-1 and 18-2 perform the same operations as information filtering unit 11 using the divided positive metric signal and negative metric signal to classify the items to present in descending order of necessity.

The following description explains a calculation method of a necessity signal used in ordering necessities of unread items in information filtering unit 11, and classification information filtering units 18-1 and 18-2.

In a preferable embodiment, the necessity signal is calculated as an amount conceptually considered as below: It is assumed that key words are contained in the input item. As key-word sets for a user, three sets are considered; a key-word set A for key words contained in the items, which the user needs, with high frequencies or high probability; a key-word set B for key words contained in the items, which the user does not need, with high frequencies or high probability; and a key-word set C for the key words contained in above both items with high frequencies or not contained in above both items. A positive numerical value is assigned to a key word belonging to the key-word set A, a negative numerical value is assigned to a key word belonging to the key-word set B, and 0 is assigned to a key word belonging to the key-word set C.

Then, it is determined to which each of key words contained in the newly input item belongs, the key-word set A, B or C to add the assigned value of the key word.

According to the above-described calculation method, the necessity signal indicative of a large positive value is calculated with respect to the item containing a large number of key words belonging to the key-word set A (item with high probability that the user needs). On the other hand, the necessity signal indicative of a large negative value is calculated with respect to the item containing a large number of key words belonging to the key-word set B (item with probability that the user does not need).

It is possible to predict the necessity of the user for the unread item using the necessity signal. In this embodiment, the assignment of the value to the key word is automatically performed using the presented item and a user's evaluation on necessary or unnecessary of the item. It is thereby achieved to calculate the necessity signal with high accuracy, and to rearrange items in descending order of necessity with high accuracy.

Specifically, in this embodiment, a plurality of key words contained in the item is converted into one vector. The auto-correlation matrix of the vector is calculated separately for each of the cases where the user needs the item or does not need.

The length SY of a vector V is calculated with the following equation (1) using the auto-correlation matrix MY generated from key words contained in the item which the user replies as necessary:

$$SY = \sum_i \sum_j MYij \cdot Vi \cdot Vj \qquad (1)$$

In addition, the auto-correlation matrix MY generated from the key words contained in the item which the user replies as necessary in the learning process is referred to as positive metric signal. The auto-correlation matrix MN generated from the key words contained in the item which the user replies as unnecessary in the learning process is referred to as negative metric signal. The length SY is referred to as positive signal.

When a plurality of key words which is the origin of the vector V contains a large number of key words which are contained often in the item that the user needs, the length SY takes a large positive value. When such a plurality of key words does not contain a large number of those, the length SY takes a value near 0. The aforementioned characteristics are effective in calculating the necessity signal.

Next, each section and operations thereof in the information filtering apparatus according to this embodiment are explained specifically.

History data storage unit 10 is provided with code dictionary storage section 21, positive metric storage section 22, negative metric storage section 23 and determination parameter storage section 24.

Code dictionary storage section 21 stores a code dictionary used to convert a plurality of character sequences such as a key word into a vector. The code dictionary, composed of code dictionary signals, is a codebook with nofDCK numbers of correspondence tables for converting a character sequence W such as the key word contained in the item into a numeric character C.

$$DCK[1] = (W[1], C[1])$$

$$DCK[nofDCK] = (W[nofDCK], C[nofDCK]) \qquad (2)$$

Positive metric storage section 22 stores the positive metric signal MY (a matrix of nofDCK×nofDCK) composed of auto-correlation matrix generated from the key words contained in the item which the user replied as necessary previously. Negative metric storage section 23 stores the negative metric signal MN composed of auto-correlation matrix generated from the key words contained in the item which the user replied as unnecessary previously. Determination parameter storage section 24 stores the determination parameter signal Q.

Information filtering unit 11 is provided with vector generating section 25, score calculating section 26, necessity calculating section 27 and unread data write control section 28.

Vector generating section 25 converts a plurality of key words (specifically, a character sequence including classification code) contained in each item into a vector. Specifically, vector generating section 25 receives a key word group signal Ks=(K[1] to K[nofKs]) composed of a key word number signal nofKS and nofKs numbers of key word signals and performs the conversion to a vector signal V using the key word group signal Ks and the code dictionary signal DCK.

Score calculating section 26 calculates a positive signal SY and negative signal SN both indicative of some kind of score from lengths of two vector signals V converted in vector conversion section 25, using the positive metric signal and negative metric signal indicative of the history that what item the user needed or did not need.

Necessity calculating section 27 receives the positive signal SY and negative signal SN and reads out the determination parameter signal Q from determination parameter storage section 24 to calculate a necessity signal N and reliability signal R.

Unread data write control section 28 has a function of writing item data D which is a main sentence of the item, the key word number signal nofKS, key word group signal Ks, necessity signal N, and reliability signal R in unread data storage section 12 according to a predetermined procedure described later.

Unread data storage section 12 stores maximum nofURD numbers of unread data items each composed of item data D which is a main sentence of the item, the key word number signal nofKS, key word group signal Ks, necessity signal N, and reliability signal R.

$$URD[1]=(N[1], R[1], nofKs[1], Ks[1], D[1])$$

$$URD[nofURD]=(N[nofURD],R[nofURD], nofKs[nofURD], Ks[nofURD], D[nofURD]) \quad (3)$$

Teaching data storage section 15 stores maximum nofTD numbers of teaching data signals.

$$TD[1]=(T[1], TnofKs[1], TKs[1])$$

$$TD[nofTD]=(T[nofTD], TnofKs[nofTD], TKs[nofTD]) \quad (4)$$

Classification interface unit 13 is provided with an unread data output control section. The unread data output control section receives a control signal DO, reads out an unread data signal URD[1] from either of unread data storage section 12, or classified unread data storage section 19-1 or 19-2 which is designated by the user, and outputs a display signal DD. Further, the unread data output control section receives a teaching signal T, which indicates whether the item displayed according to the display signal DD is necessary or unnecessary for the user, from the user, and writes the teaching signal T, and the key word number signal nofKs [1] and key word group signal Ks [1] of the unread data signal URD [1] in teaching data storage section 15 according to a predetermined procedure.

Learning unit 16 is primarily composed of a section which performs metric learning for modifying the positive or negative metric signal using the teaching signal T input from the user, another section which modifies the determination parameter signal that is a parameter used in calculating the necessity signal from the positive or negative signal, and the other section which controls each section.

Figure 3:
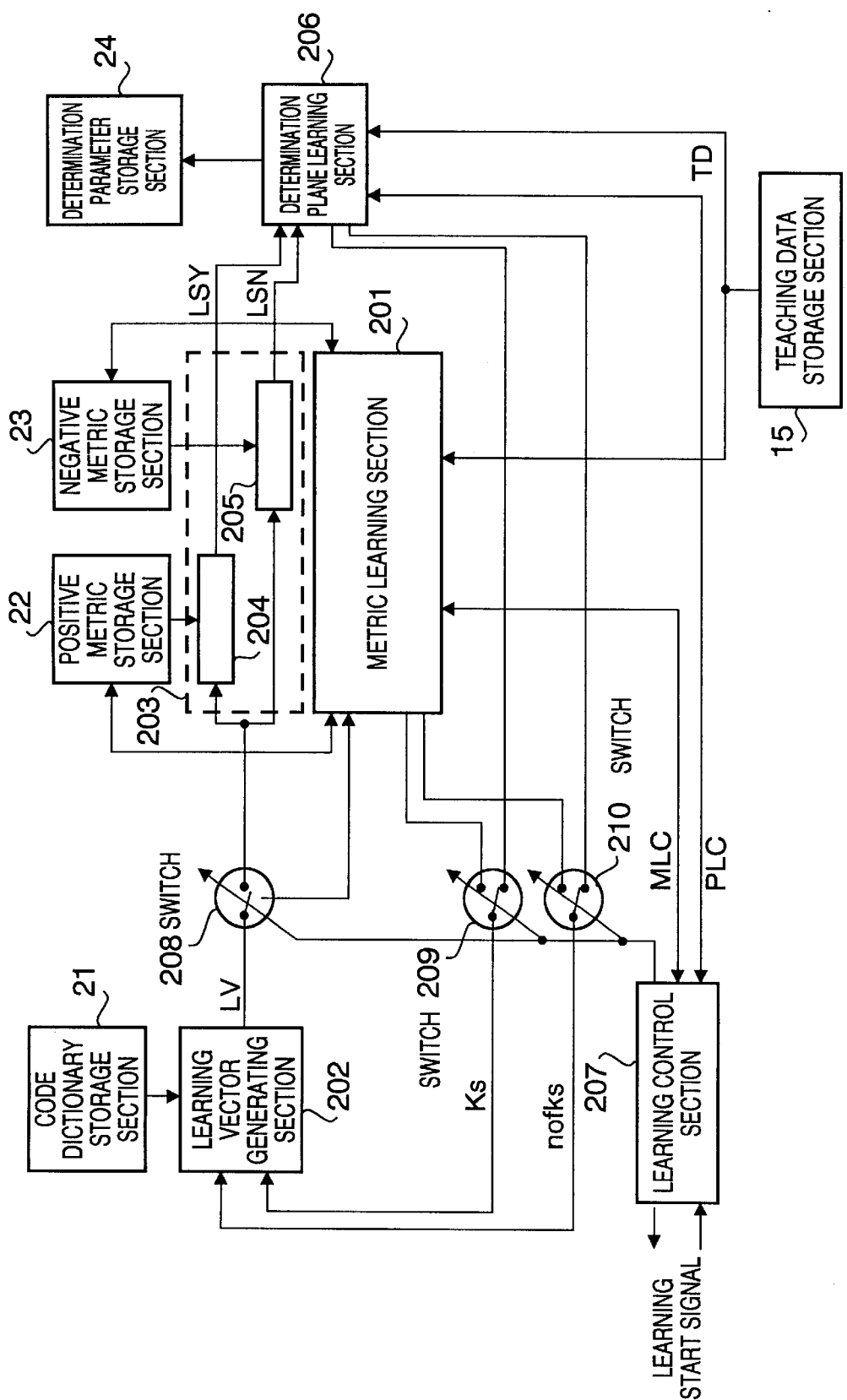
FIG. 3 is a block diagram of a learning unit in the above embodiment.

FIG. 3 illustrates a function block diagram of learning unit 16 and peripheral circuits thereof.

A configuration of the section which performs the metric learning is first explained. Learning unit 16 is provided with metric learning section 201 which modifies the positive metric signal MY stored in positive metric storage section 22 and negative metric signal MN stored in negative metric storage section 23. Metric learning section 201 reads out the teaching data TD from teaching data storage section 15. Learning vector generating section 202, which has the same function as previously described vector generating section 25, converts a plurality of key words into vectors to calculate auto-correlation matrixes. Thus, the positive metric signal and negative metric signal are modified.

A configuration of the section which performs learning of determination parameter signal is next explained. Learning unit 16 is provided with learning score calculating section 203 which performs score calculation for the learning. Learning score calculating section 203 is composed of learning positive signal calculating section 204 and learning negative signal calculating section 205. Learning positive signal calculating section 204 receives a learning vector signal from learning vector generating section 202 to calculate a learning positive signal LSY, and learning negative signal calculating section 205 receives the learning vector signal from learning vector generating section 202 to calculate a learning negative signal LSN.

Further, learning unit 16 is provided with determination plane learning section 206. Determination plane learning section 206 receives a determination parameter learning control signal PLC from learning control section 207, and rewrites the determination parameter signal in determination parameter storage section 24 according to a predetermined method. Learning control section 207 receives a learning start signal LS, and controls switches 208, 209 and 210, metric learning section 201, learning vector generating section 202, learning score calculating section 203 and determination plane learning section 206.

Operations in each unit in the information filtering apparatus configured as described above are next explained specifically using drawings.

An example of a preferable initial state in the information filtering apparatus is as follows: That is, the positive metric signal MY and negative metric signal MN are zero matrixes of (nofDCK×nofDCK), V is set at a minimum value Vmin to enable the display by hardware using all necessity signals N[i] (i=1 to nofURD) of unread data URD[i] in unread data storage section 12, and teaching signals T [j] of teaching data TD [j] in teaching data storage section 15 are all −1.

Operations in information filtering unit 11 are explained. To information filtering unit 11, an item D is input from an item input terminal, the key word number signal nofKs indicative of the number of key words contained in the item is input from a key word number signal input terminal, and the key word group signal Ks=(K[1], K[2] to K[nofKS]) indicative of a plurality of key words is input from a key word signal input terminal.

Vector generating section 25 converts the key word group signal Ks that is a set of character sequences into the vector signal V. According to this conversion, it is possible to calculate the similarity of the key word group signal as a distance of vector.

Figure 4:
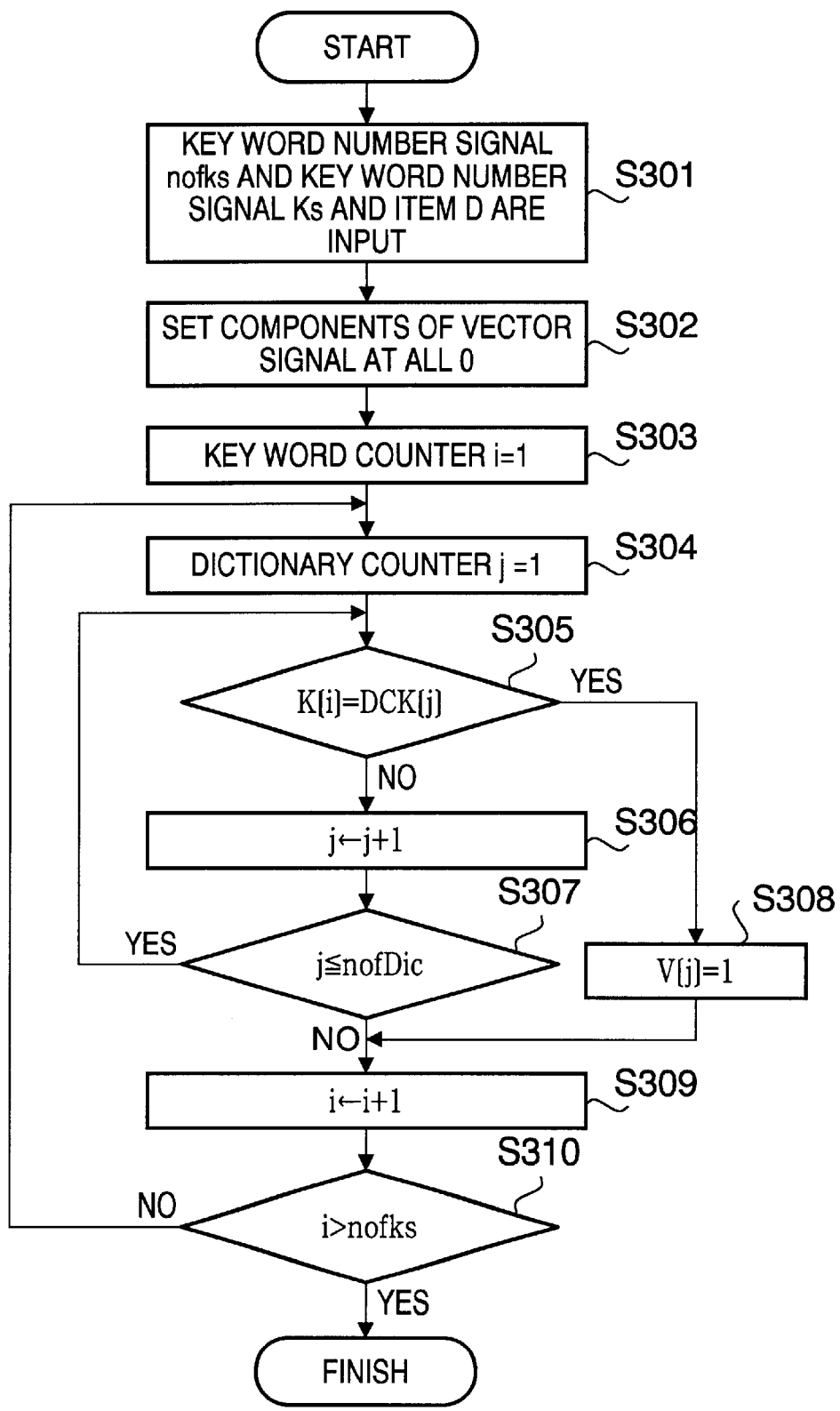
FIG. 4 is a flowchart to explain operations in a vector generating section in the above embodiment.

FIG. 4 illustrates a flowchart of operations in vector generating section 25. As illustrated in FIG. 4, when vector generating section 25 receives the key word number signal nofKS and the key word group signal Ks (S301), vector generating section 25 sets the vector signal V=(V[1], V[2] to V[nofDic]) at (0, 0 to 0), and sets a key word counter signal i at 1 (S302 and S303). Next, a dictionary counter signal j is set at 0, and then increased by 1 (S304).

Vector generating section 25 next reads out a code dictionary signal DCK [j] composed of a key word and a numeric character designated by the dictionary counter j from code dictionary storage section 21 having nofDCK numbers of code dictionary signal DCKs, and compares a character sequence portion W[j] in the code dictionary signal DCK with ith key word signal K[i] (S305). When the portion and the signal are not equal, the dictionary counter j is increased by 1 (S306). Until the portion and the signal match, or the value of the dictionary counter j becomes equal to nofDIC that is the number of code dictionary signals stored in code dictionary storage section 21, processing of step S305 to S307 is repeated.

When W[j] equal to the keyword signal K[i] is found out, a component V[j] that is the jth component of the vector signal V is set at 1 (S308), and the key word counter signal i is increased by 1 (S309). Then, the aforementioned processing is repeated until the key word counter signal i becomes larger than the key word number signal nofKs (S310).

Thus, vector generating section 25 converts the key word group signal Ks that is a set of key word signals composed of character sequence signals into the vector signal V having nofDCK numbers of vector components encoded with 0 and 1.

Next, score calculating section 26 calculates the positive signal SY. The positive signal SY becomes a large value when the key word group signal Ks contains a large number of key words contained in the item that the user needed previously. For such a calculation, when score calculating section 26 receives the vector signal V from vector generating section 25, score calculating section 26 reads out the positive metric signal MY from positive metric storage section 22 to calculate the positive signal SY with the following equation (5).

$$SY = \sum_{i=0}^{nofDiC-1} \sum_{j=0}^{nofDiC-1} MY[i][j] \cdot V[i] \cdot V[j] \quad (5)$$

Further, score calculating section 26 calculates the negative signal SN. The negative signal SN becomes a large value when the key word group signal Ks contains a large number of key words contained in the item that the user did not need previously. For such a calculation, score calculating section 26 reads out the negative metric signal MN from negative metric storage section 23 to calculate the negative signal SN with the following equation (6).

$$SN = \sum_{i=0}^{nofDiC-1} \sum_{j=0}^{nofDiC-1} MN[i][j] \cdot V[i] \cdot V[j] \quad (6)$$

Figure 10:
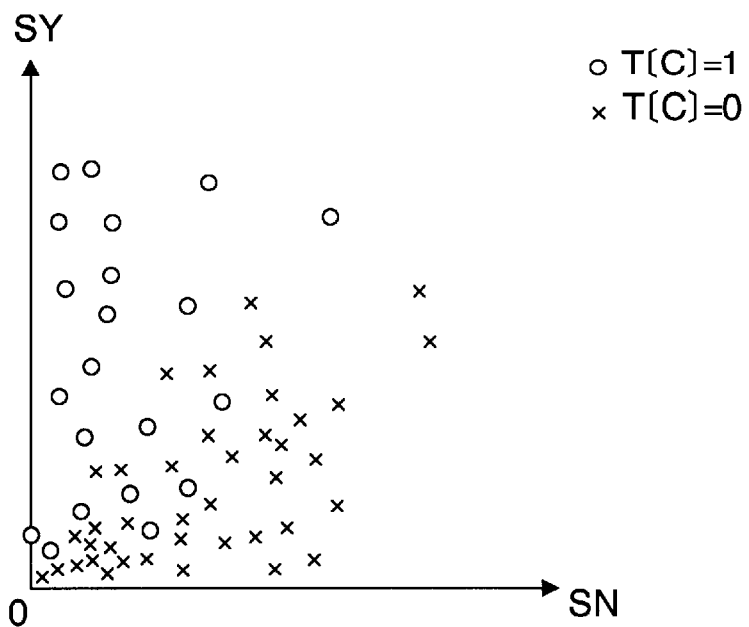
FIG. 10 is a diagram to explain operations in a determination plane learning section in the information filtering apparatus in the embodiment of the present invention.
Figure 11:
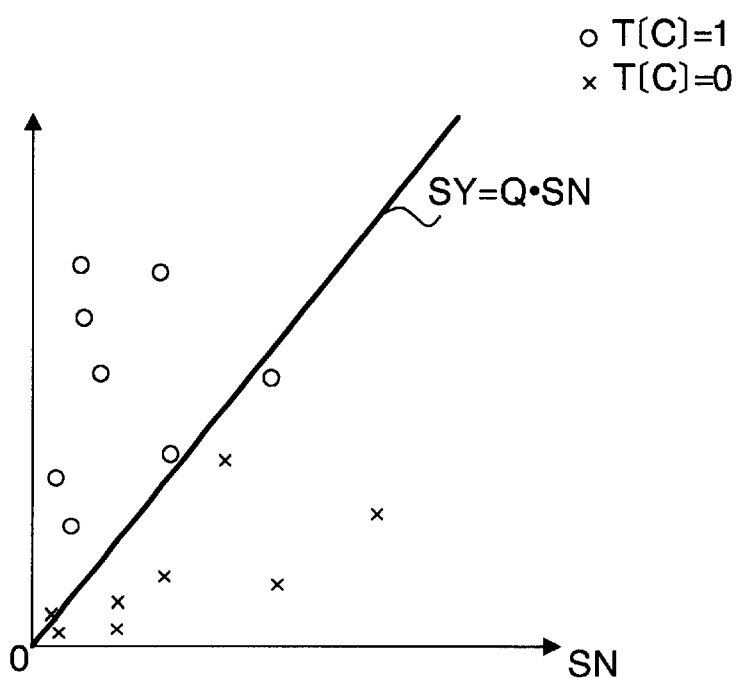
FIG. 11 is a diagram to explain operations in a determination plane learning section in the information filtering apparatus in the embodiment of the present invention.

The positive metric signal MY and negative metric signal MN are determined based on the key word group signal Ks and a reply from the user as described later. In this embodiment, as illustrated in FIG. 10, the item D is plotted at a point on a two-dimensional space, with thus calculated positive signal SY as ordinate and thus calculated negative signal SN as abscissa. On the distribution of the item D, the items which the user needs (indicated with ○) are distributed mostly on a left upper portion, and the other items which the user does not need (indicated with X) are distributed mostly on a right lower portion. Accordingly, it is possible to separate items Ds necessary for the user and the others items Ds unnecessary for the user by determining a coefficient Q appropriately as illustrated in FIG. 11.

Further, the necessity signal N calculated using the coefficient Q described below becomes a large value, as being present further on a left upper portion, in other words, for the item predicted that the necessity thereof is high. Accordingly, when the items Ds are presented in descending order of value of necessity signal N thereof, the user can acquire necessary items efficiently. The reliability signal R has a direction that is vertical to that of the necessity signal N, and indicates the number of key word signals contained in the dictionary among key words contained in the key word group signal Ks. Accordingly, the value of reliability signal R indicates the reliable degree of the necessity signal N calculated by an information filter.

Next, necessity calculating section 27 receives the positive signal SY obtained by a positive signal calculation in score calculating section 26 and the negative signal SN obtained by a negative signal calculation in score calculating section 26, reads out the determination parameter signal Q from determination parameter storage section 24, and calculates the necessity signal N and reliability signal R. The necessity signal N becomes a large value when there is a large number of key words contained in the item which was necessary previously and few key words contained in the item which was unnecessary previously. Specifically, the necessity signal N and reliability signal R are respectively calculated with the following equations:

$$N = SY - Q \cdot SN$$

$$R = Q \cdot SY + SN$$

Figure 5:
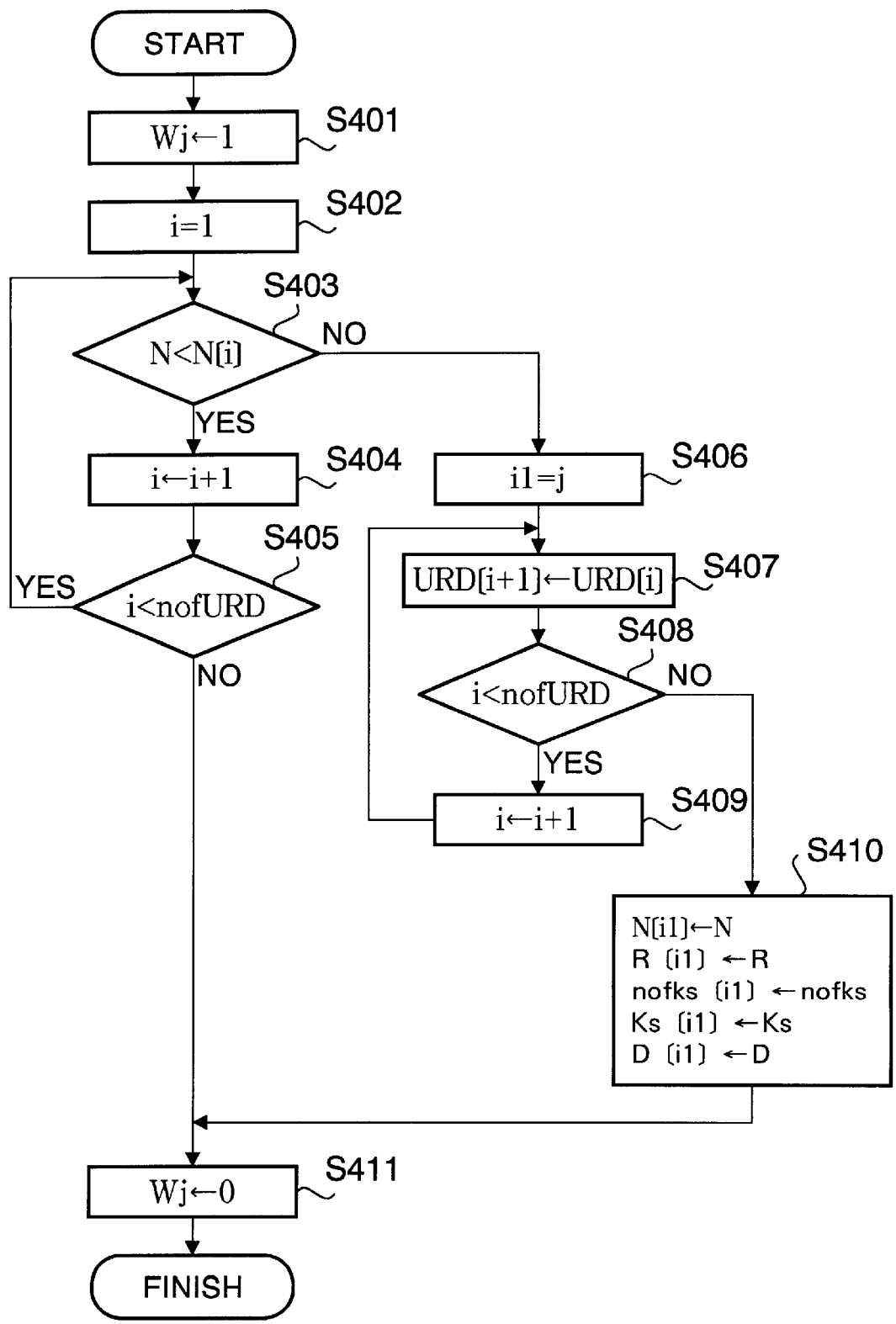
FIG. 5 is a flowchart to explain operations in an unread data write control section in the above embodiment.

Operations in unread data write control section 28 are next explained. FIG. 5 illustrates a flowchart of operations in unread data write control section 28. First, unread data write control section 28 receives the item D, key word number signal nofKs, and key word group signal Ks from respective input terminals, further receives the necessity signal N and reliability signal R from necessity calculating section 27, and converts a value of an unread data processing signal WI output from an unread data section designation terminal, from 0 to 1 (S401). Next, unread data write control section 28 sets i=1 (S402), reads out necessity signal N[i] (i=1 to nofURD) of unread data URD[i] stored in unread data storage section 12 sequentially to compare with the necessity signal N (S403), and obtains the unread data number i1 detected when the necessity signal N is first larger than the necessity signal N[i] (N≧N[i]) of unread data URD[i] (S404 and S405).

Unread data after the i1th unread data is replaced as follows (S406 to S409):

$$URD[i+1] = URD[i] \quad i = i1 \text{ to } nofURD$$

Then, the i1th unread data URD[i1] is replaced with the necessity signal N and others as follows (S410):

$$N[i1] = N$$

$$R[i1] = R$$

nofKS[i1]=nofKS

Ks[i1]=Ks

D[i1]=D

After the replacement is completed, unread data write control section 28 sets the unread data section designation signal WI output from the unread data section designation terminal at 0 (S411), and finishes the processing.

Next description explains operations in classification interface unit 13 performed to read out the unread data URD and add a reply of the user (the teaching signal T) thereto so as to generate a teaching data signal TD.

Figure 6:
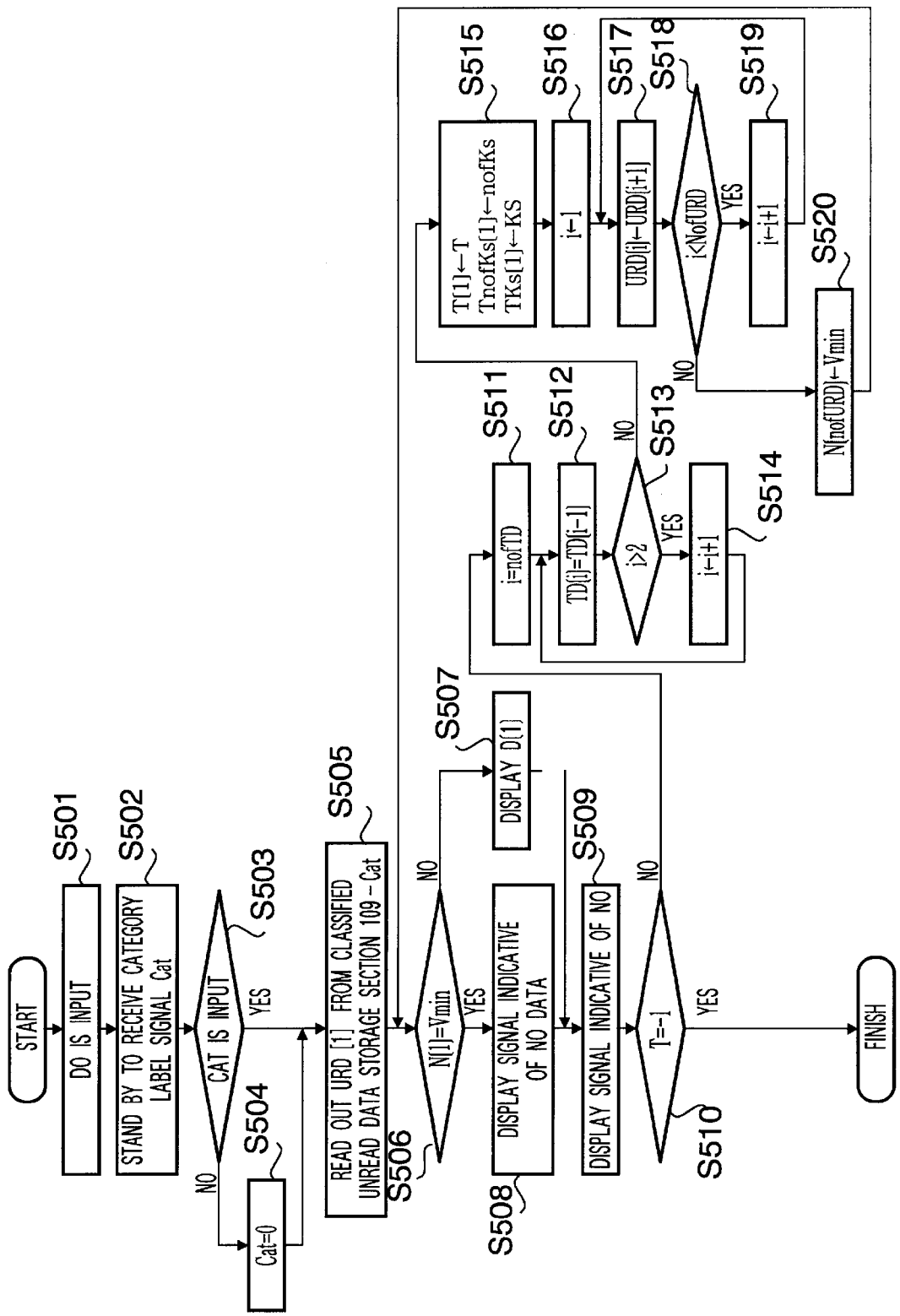
FIG. 6 is a flowchart to explain operations in a classification interface unit in the above embodiment.

FIG. 6 is a flowchart illustrating operations in classification interface unit 13. In a preferable embodiment, unread data storage section 12 is treated as a classified unread data storage section with a category label signal Cat being 0. In the following, when operations in the classification interface unit are explained, unread data storage section 12 is treated as classified unread data storage section with the category label signal Cat being 0.

A data reading start signal DO is input to classification interface unit 13 from a data reading start signal input terminal (S501). Classification interface unit 13 stands by for a predetermined time to receive the category label signal Cat for designating unread data storage section 12 or a classified unread data storage section category to be accessed (S502). When the category label signal Cat is not input within the predetermined time, classification interface unit 13 sets the category label signal Cat at a standard value (cat=0 in the preferable embodiment) (S504). When a value for the category label signal Cat is input within the predetermined time or set at the standard value, classification interface unit 13 reads out the first unread data URD[1] from classification unread data storage section 19-Cat designated by the category label signal Cat (S505), outputs an information signal D[1] of the unread data signal URD[1] as a data display signal DD to data display device 14 when the necessity signal N[1] of the unread data is larger than the minimum value Vmin, and stands by (S506 and S507). When the necessity signal N[1] of the unread data is equal to the minimum value Vmin, classification interface unit 13 outputs the data display signal DD indicative of no data to a data display terminal and stands by (S508).

The user (not shown) watches the data display signal DD displayed in data display device 14. The user inputs the teaching signal T=1 when the item is necessary, the teaching signal T=0 when the item is not necessary, and the teaching signal T=1 when the processing is finished, to a teaching signal input terminal (S509). When the teaching signal T=−1, the processing is finished, and when T≠−1 (S511), unread data output control section 28 replaces teaching data represented by the equation (3) in teaching data storage section 15 as follows (S512):

$$TD[i]=TD[i-1], i=2 \text{ to } nofTD$$

Unread data output control section 28 further replaces the first teaching data TD[1] using the teaching signal T, the key word number signal nofKs[1] and key word group signal Ks[1] of the unread data as follows (S513 and S515):

T[1]=1

TnofKs[1]=nofKs

TKs[1]=Ks[1]

Unread data output control section 28 sets unread data URD in unread data storage section 12 as follows (S516 and S517):

$$URD[i]=URD[i+1], i=1 \text{ to } (nofURD-1)$$

Unread data output control section 28 further sets the necessity signal of the nofURDth unread data as follows (518 to S520):

N[nofURD]=(minimum value Vmin)

Operations in learning unit 16 are next explained.

Figure 7:
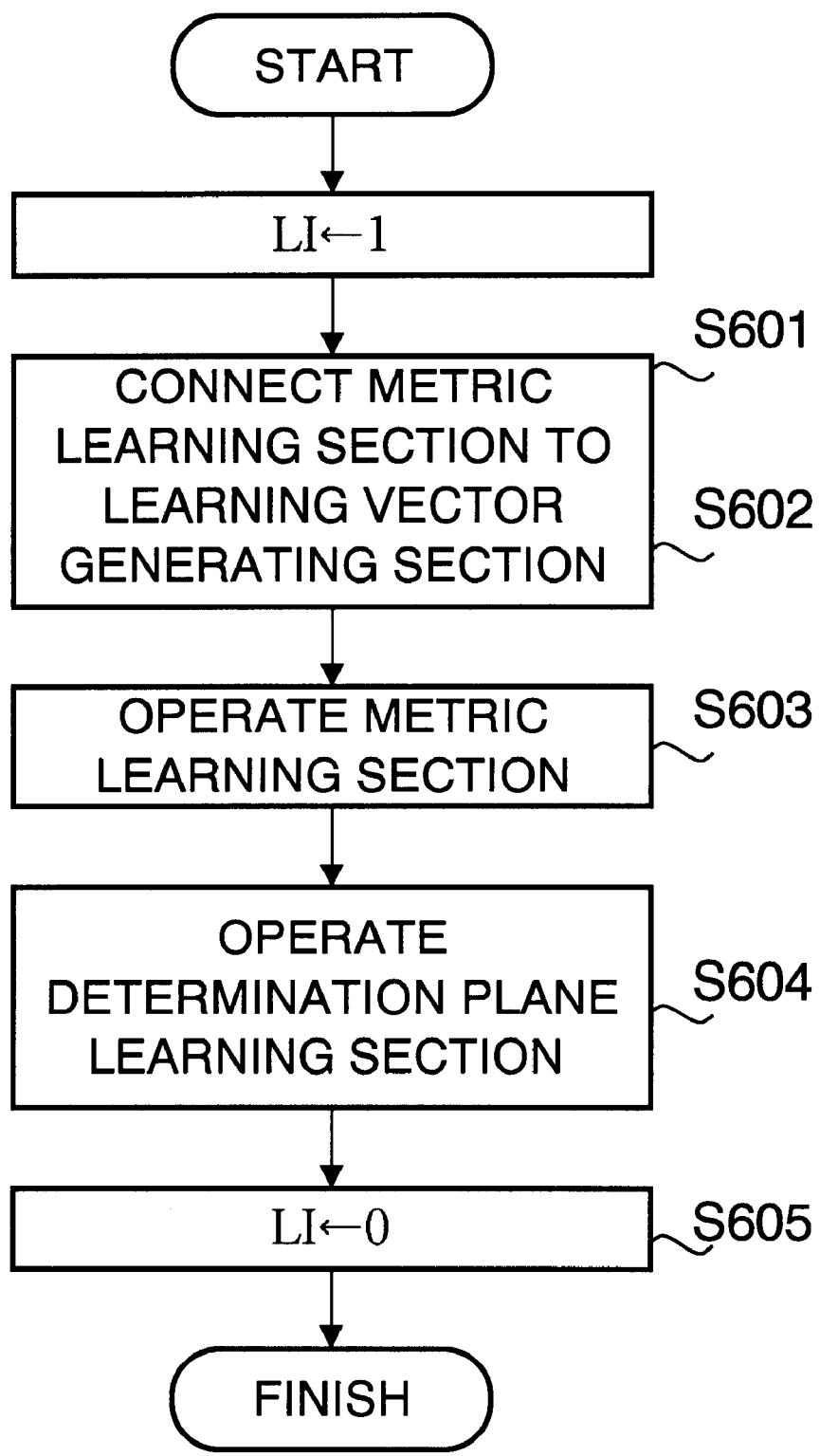
FIG. 7 is a flowchart to explain operations in a learning control section in the above embodiment.

FIG. 7 is a flowchart illustrating schematic operations in learning control section 207. A learning start signal LS is first input from a learning signal input terminal, a learning control section designation signal LI output from a learning control section designation signal output terminal is changed from 0 to 1 (S601) to indicate on proceeding. Switches 208, 209 and 210 are switched so that metric learning section 201 and learning vector generating section 202 are connected (S602).

Learning control section 207 next operates metric learning section 201 (S603), further operates determination plane learning section 206 (S604), sets LI at 0 (S605) and then finishes the processing.

The next description explains operations performed by metric learning section 201 to modify the positive or negative signal using a reply of the user (teaching signal T) and key word group signal Ks.

Figure 8:
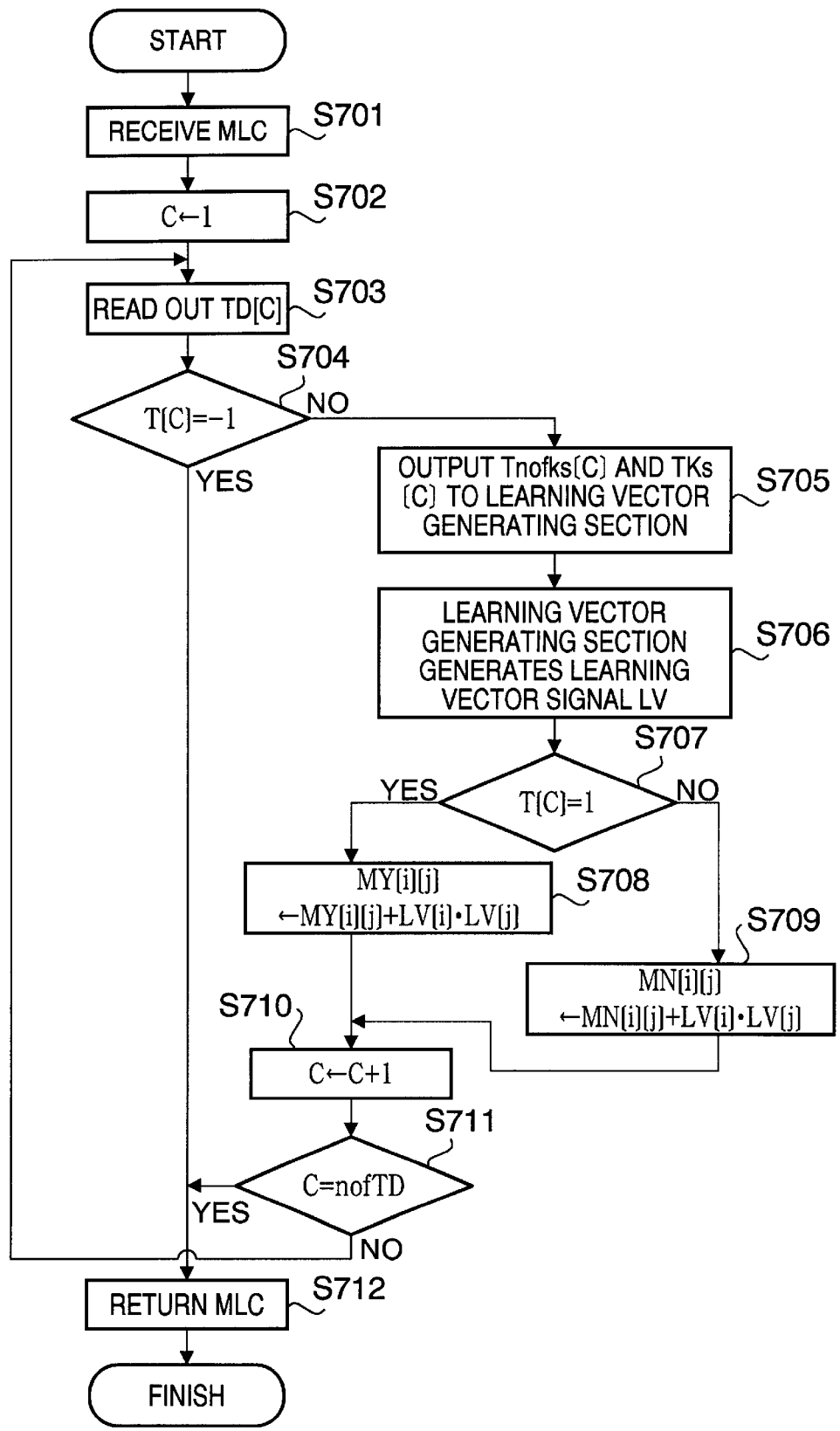
FIG. 8 is a flowchart to explain operations in a metric learning section in the above embodiment.

FIG. 8 is a flowchart of operations in metric learning section 201. Metric learning section 201 receives a metric learning control signal MLC from learning control section 207 (S701), and then reads out the positive metric signal MY and negative metric signal MN respectively from positive metric storage section 22 and negative metric storage section 23.

Metric learning section 201 next sets a value of teaching data counter c at 1 (S702). Metric learning section 201 reads out cth teaching data signal TD[c] from teaching data storage section 15 (S703) to examine a teaching signal T[c] of the teaching data TD[c]. When the teaching signal T[c] is not −1 (T≠−1) (S704), metric learning section 201 outputs the key word number signal TnofKs[c] and key word group signal TKs[c] of teaching data TD[c] (S705). Learning vector generating section 202 receives the key word number signal TnofKs[c] and key word group signal TKs[c] of teaching data TD[c], performs the same operations as vector generating section 25 in information filtering unit 11 previously described (S706), and outputs a learning vector signal LV. Metric learning section 201 receives the learning vector signal LV, and when the teaching signal T[c] of the teaching data TD[c] is 1 (T=1), modifies the positive metric signal MY as follows (S708):

$$MY[i][j]=MY[i][j]+LV[i] \cdot LV[j]$$

where i, j=1 to nofDIC

According to this processing, the positive metric signal has a large value with respect to key word signals contained in the item D which the user needed. As a result, the positive signal SY described previously has a larger value with respect the item D which the user needs. The negative metric signal MN is also subjected to the similar processing described below.

When the teaching signal T[c] of teaching data TD[c] is 0 (T=0 ), metric learning section 201 modifies the negative metric signal MN as follows (S709):

$$MN[i][j]=MN[i][j]+LV[i] \cdot LV[j]$$

where i, j=1 to nofDIC

Metric learning section 201 further increases the value of teaching data counter by 1 as follows (S710):

$$c = c + 1$$

Then, metric learning section 201 repeats the same processing until the teaching signal T[c] of teaching data TD[c] becomes −1 (T[c]=−1), or c becomes nofFD (c=nofTD). When T[c]=−1 or c=nofTD (S712), metric learning section 201 finishes the processing of metric learning, and outputs the metric learning control signal MLC to learning control section 207.

Learning control section 207 receives the metric learning control signal MLC from metric learning section 201, and then switches switch 208 to connect learning vector generating section 202 to score calculating section 203, and switches 209 and 210 to connect learning vector generating section 202 to determination plane learning section 206. Learning control section 207 outputs a determination plane learning control signal PLC to determination plane learning section 206.

Figure 9:
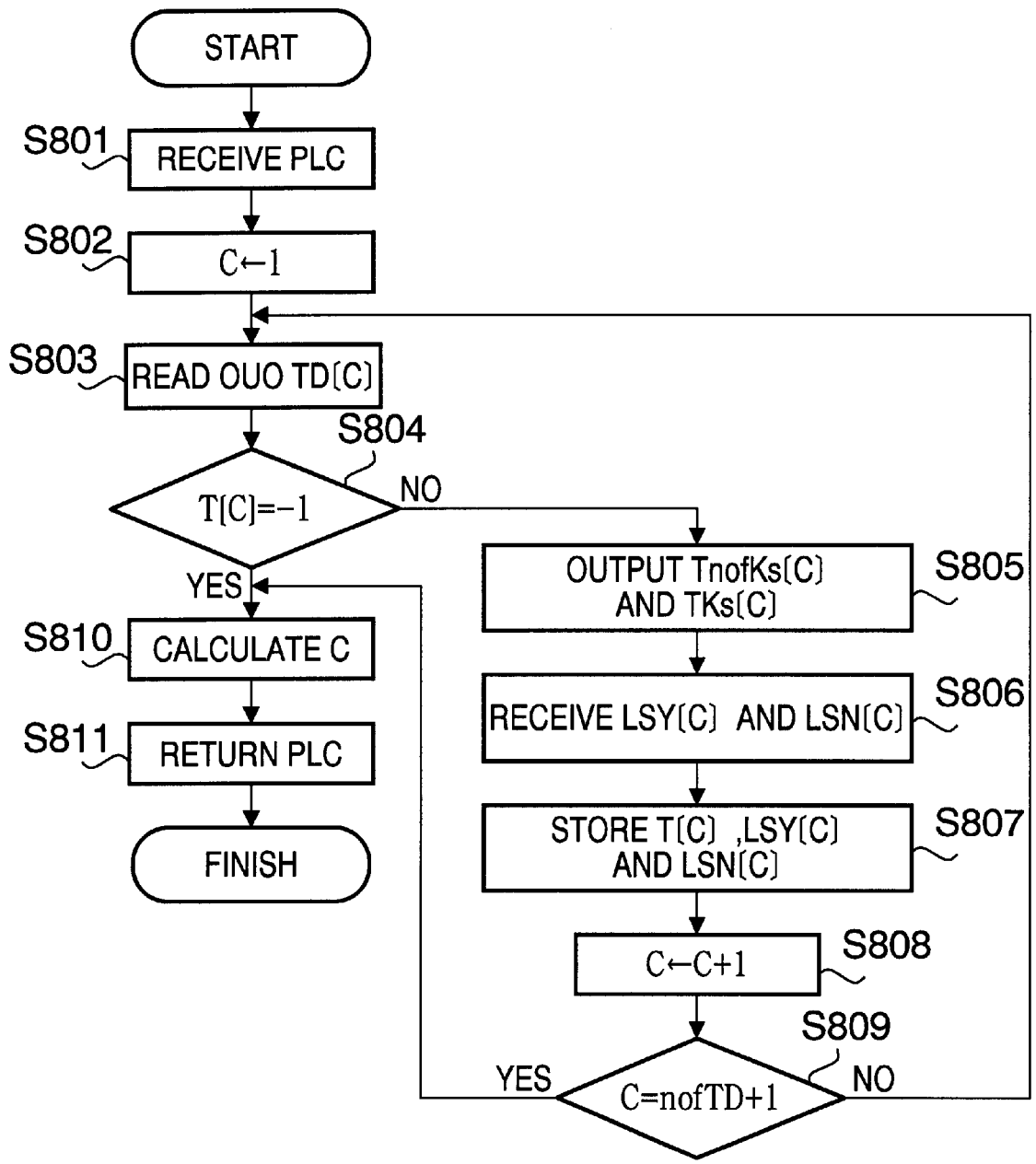
FIG. 9 is a flowchart to explain operations in a determination plane learning section in the above embodiment.

Operations in determination plane learning section 206 are explained in detail using FIG. 9.

Determination plane learning section 206 calculates the coefficient Q, as illustrated in FIG. 11, which is the most appropriate coefficient to separate the item D that the user needs and the item D that the user does not need both plotted on the two-dimensional space using the positive signal SY and negative signal SN.

Determination plane learning section 206 first receives the determination plane learning control signal PLC (S801), and sets a value of teaching data counter c at 1 (S802). Determination learning control section 206 reads out cth teaching data signal TD[c] from teaching data storage section 15 (S803) to examine a teaching signal T[c] of the teaching data TD[c] (S804). When the teaching signal T[c] is not −1 (T≠−1), determination plane learning section 206 outputs the key word number signal TnofKs[c] and key word group signal TKs[c] of teaching data TD[c] (S805). Learning vector generating section 202 receives the key word number signal TnofKs[c] and key word group signal TKs[c] of teaching data TD[c], performs the same operations as vector generating section 25 in information filtering unit 11 described previously, and outputs the learning vector signal LV.

Learning score calculating section 203 performs the same operations as score calculating section 26 in information filtering unit 11 described previously, and outputs a learning positive signal LSY[c] and a learning negative signal LSN [c] to determination plane learning section 206 (S806). Determination plane learning section 206 stores the received learning positive signal LSY[c], learning negative signal LSN[c], teaching signal T[c] of teaching data TD and determination plane learning signal TC[c]=(T[c], LSN[c], LSY[c]) in an internal memory element (S807), and then increases the value of teaching data counter by 1 as follows (S808):

$$c = c + 1$$

Then, determination plane learning section 206 repeats the same processing until the teaching signal T[c] of teaching data TD[c] becomes −1 (T[c]=−1), or c becomes nofFD+1 (c=nofTD+1) (S809). When T[c]=−1 or c=nofTD+ 1, determination learning section 206 finishes the processing such as calculation of learning positive signal LSY[c].

Next, determination plane learning section 206 plots determination plane learning signal TC[c] (c=1 . . . ) stored in the internal memory element with LSN[c] as abscissa and LSY as ordinate. When T[c]=1 and T[c]=0 are respectively indicated with ○ and X, such plots show the distribution as illustrated in FIG. 10. Determination plane learning section 206 calculates the determination parameter Q capable of separating teaching signals of T[c]=1 and teaching signals of T[c]=0 optimally, as illustrated in FIG. 10, according to a hill climbing method (S810).

Further, determination plane learning section 206 writes the determination parameter Q in determination parameter storage section 24, outputs the determination plane learning control signal PLC to learning control section 207, and then finishes the processing.

Learning control section 207 receives the determination plane learning control signal PLC, sets the learning control section designation signal at a value indicative of standby, and then finishes the processing.

As illustrated in FIG. 10, by the use of the above-mentioned two metric signals, the items which the user needs and the other items which the user does not need are respectively distributed mostly on a left upper portion and a right lower portion on the two-dimensional space represented with the positive signal SY and the negative signal SN. Accordingly, when the necessity signal N is set at N=SY−Q·SN using the appropriate coefficient Q as described above, the necessity signal becomes a large value for the item which the user needs.

According to the above-described operations, the generated matrixes in which interests of the user are reflected, i.e., the positive metric signal MY and negative metric signal are respectively stored in positive metric storage section 22 and negative metric storage section 23.

This embodiment achieves the classification of interests suited for each user by appropriately dividing the matrixes generated as described above, in which interests of the user are reflected.

Specifically, metric dividing unit 17 reads out the positive metric signal MY and negative metric signal MN respectively to generate a classification positive metric signal ClassMY and classification negative signal ClassNN each divided corresponding to groups in which interests of the user are reflected, and stores such signals respectively in a classification positive metric storage portion and a classification negative metric storage portion in classification information filtering units 18-1 and 18-2.

Figure 12:
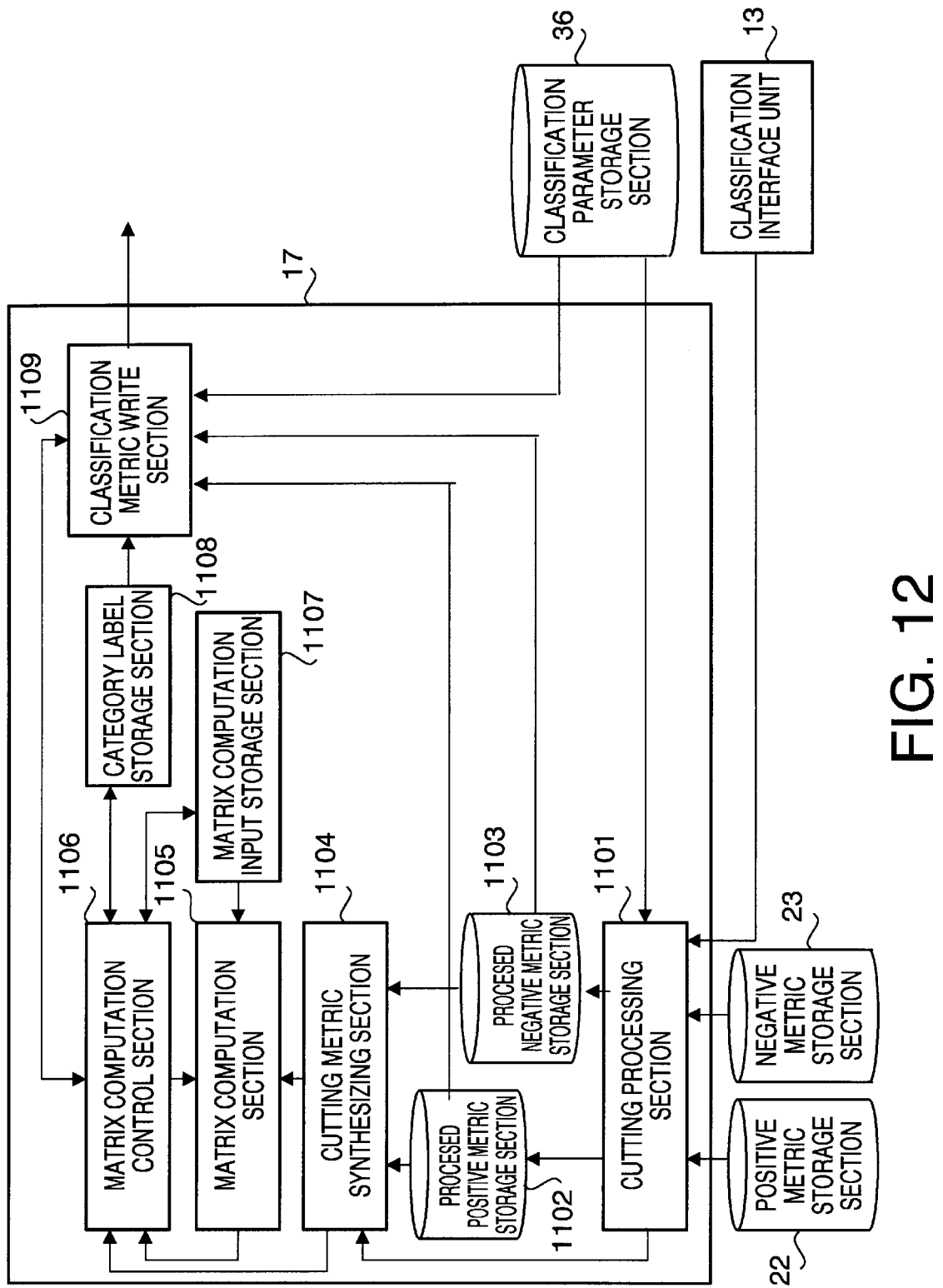
FIG. 12 is block diagram of a metric dividing unit in the above embodiment.

FIG. 12 illustrates a configuration of metric dividing unit 17. Metric dividing unit 17 is provided with cutting processing section 1101, processed positive metric storage section 1102, and processed negative metric storage section 1103. Cutting processing section 1101 reads out a filtering threshold from classification parameter storage section 36, and executes the cutting processing for eliminating a component, apt to be noise in classifying, of the positive metric signal MY and negative metric signal MN. Processed positive metric storage section 1102 stores a processed positive metric signal CMY that is the positive metric signal subjected to the cutting processing, and processed negative metric storage section 1103 stores a processed negative metric signal CMN that is the negative metric signal subjected to the cutting processing.

FIG. 12 has the configuration in which classification interface unit 13 is connected to classification start signal input terminal. Further, good results are also obtained in the configuration, as illustrated in FIG. 2, in which classification interface unit 13 is connected to the learning unit, so as to execute fraction processing automatically each time the learning is performed.

Further, metric dividing unit 17 is provided with filtered metric synthesizing section 1104, matrix computation section 1105, and matrix computation control section 1106.

Filtered metric synthesizing section 1104 calculates a filtered metric signal CM from the processed positive metric signal CMY and processed negative metric signal CMN. Matrix computation control section 1106 controls the matrix computation executed using the filtered metric signal CM. Matrix computation section 1105 is controlled by matrix computation control section 1106.

Furthermore, metric dividing unit 17 is provided with matrix computation input storage section 1107, category label storage section 1108, and classification metric write section 1109. Matrix computation input storage section 1107 stores inputs to matrix computation section 1105. Category label storage section 1108 stores vectors with category labels as components based on a result of the matrix computation. Classification metric write section 1109 reads out the vector components stored in category label stored section 1108, the processed positive metric signal CMY, processed negative metric signal CMN, and the maximum classifying number stored from classification parameter storage 36, and sets the classification positive metric signal ClassMY and classification negative metric signal ClassMN in the classification information filtering unit.

Next, operations in metric dividing unit 17 are explained using flowcharts. Metric dividing unit 17 becomes a standby state when the learning start signal LS is input from the learning start signal input terminal, and then starts the following processing illustrated in FIG. 13 to FIG. 16 when a value of the learning control section designation signal LI is changed from 1 to 0 to indicate the finish of operations in learning unit 16.

Figure 13:
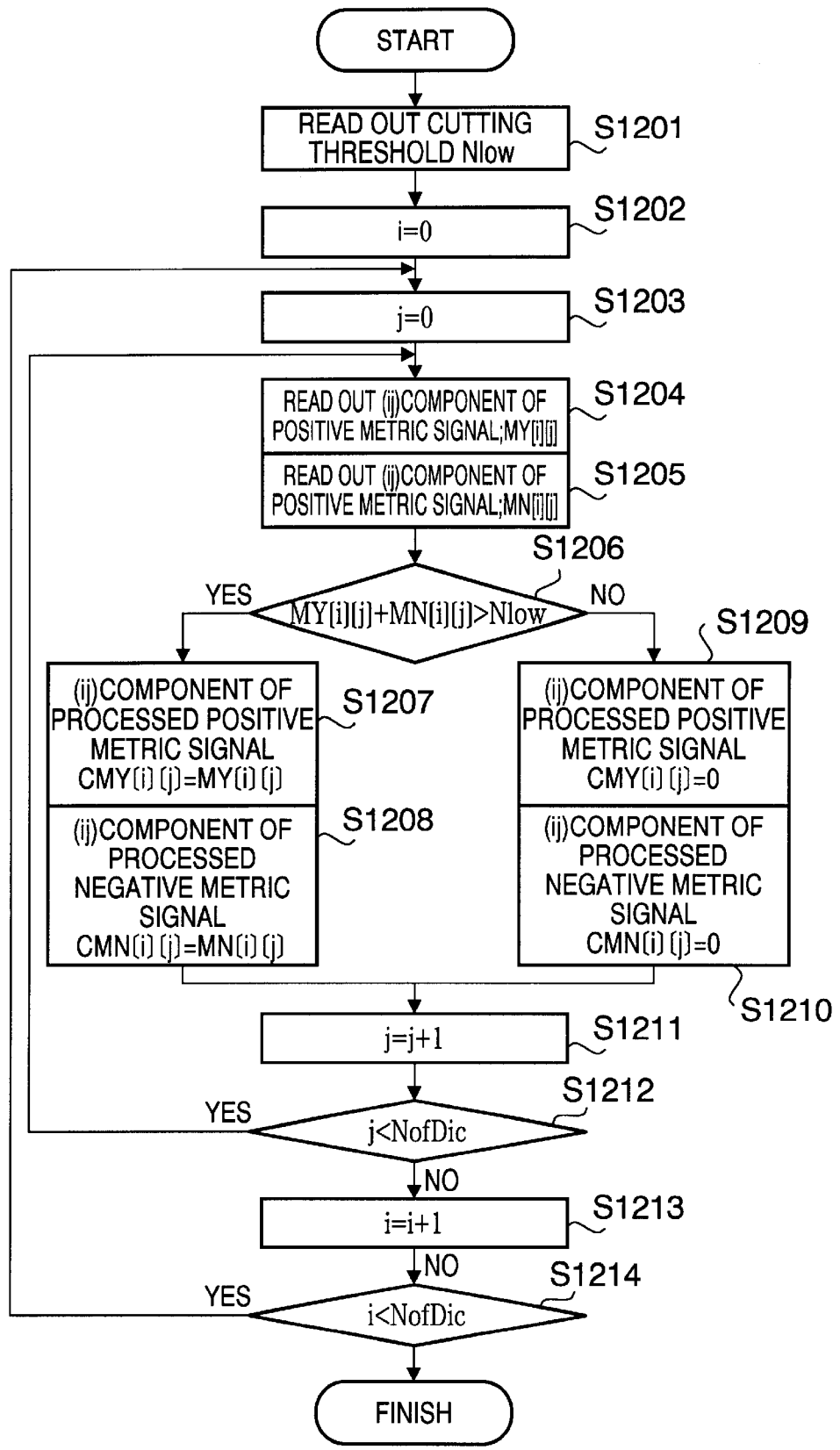
FIG. 13 is a flowchart to explain operations in a cutting processing section in the above embodiment.

FIG. 13 illustrates a flowchart illustrating the processing in cutting processing section 1101. The processing is to discard a component with a small value among each component of the positive metric signal MY and negative metric signal MN. By the cutting processing, each of two metric signals, which can be represented with matrixes, becomes a submatrix independent to each other, providing easy multiplication as a sum.

Cutting processing section 1101 receives a classification start signal CSt from a classification start signal input terminal, reads out the filtering threshold Nlow from classification parameter storage 36 (S1201), and sets a column counter i and a row counter j each at o (S1202 and S1203).

Next, cutting processing section 1101 reads out MY[i][j] that is an (ij) component of positive metric signal MY and MN[i][j] that is an (ij) component of negative metric signal MN respectively from positive metric storage section 22 and negative metric storage section 23 (S1204 and S1205).

Further, the sum of MY[i][j] that is the (ij) component of positive metric signal MY and MN[i][j] that is the (ij) component of negative metric signal MN (ij) is compared with the filtering threshold Nlow (S1206).

When the sum is larger the filtering threshold Nlow, MY[i][j] that is the (ij) component of positive metric signal MY is substituted for CMY[j][j] that is an (ij) component of processed positive metric signal CMY, and MN[i][j] that is the (ij) component of negative metric signal MN (ij) is substituted for CMN[j][j] that is an (ij) component of processed negative metric signal CMY (S1207 and S1208). The value of row counter j is increased by 1 (S1211). Then, cutting processing section 1101 executes the same processing on all components.

When the aforementioned processing is finished, cutting processing section 1101 outputs a metric synthesizing start signal to filtered metric synthesizing section 1104.

Figure 14:
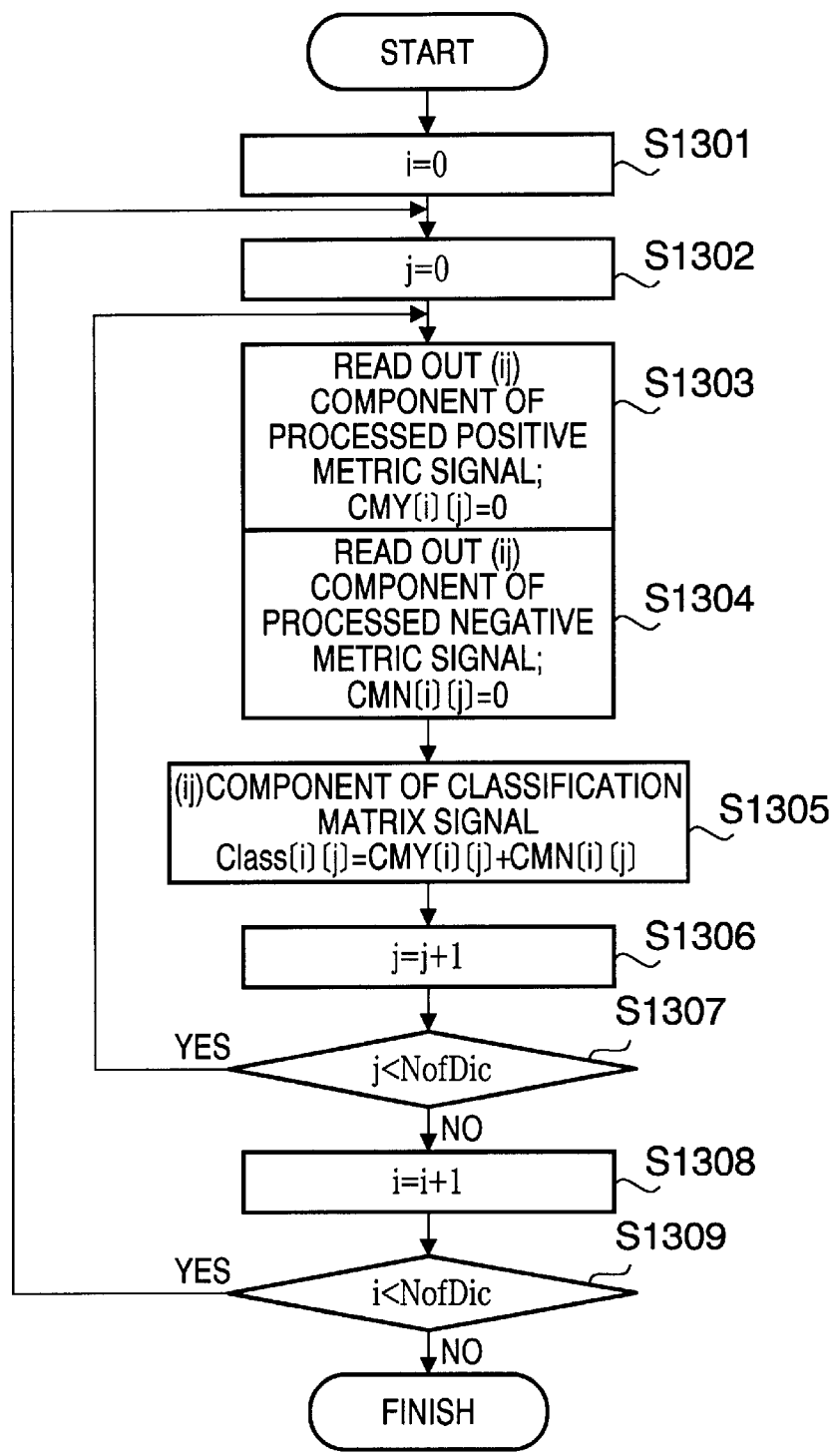
FIG. 14 is a flowchart to explain operations in a metric synthesizing section in the above embodiment.

Filtered metric synthesizing section 1104 executes the synthesizing processing according to a flowchart illustrated in FIG. 14. First, the column counter i and the row counter j are each set at 0 (S1301 and S1302). Then, filtered metric synthesizing section 1104 reads out CMY[j][j] that is the (ij) component of processed positive metric signal CMY from processed positive metric storage section 1102, and CMN[j][j] that is the (ij) component of processed negative metric signal CMY from processed negative metric storage section 1103 (S1304).

Next, the sum of CMY[i][j] of processed positive metric signal and CMN[i][j] of processed negative metric signal is calculated, and a classification matrix signal Class with (ij) component is generated (S1305).

Then, filtered metric synthesizing section 1104 increases the row counter j by 1 (S1306), and executes the same processing on all components until the row counter j exceeds NofDiC that is the number of rows (S1307). Further, filtered metric synthesizing section 1104 increases the column counter i by 1 (S1308), and executes the same processing on all components until the column counter j exceeds NofDiC that is the number of columns (S1309). When the aforementioned processing is finished, matrix computation section 1105 outputs a matrix computation start signal to matrix computation control section 1106.

Matrix computation control section 1106 receives the matrix computation start signal, and executes the processing for detecting a vector to be converted independently by the classification matrix signal Class. The details of the processing is explained with reference to a flowchart illustrated in FIG. 15. An object of a series of this processing is to specify components of the input vector, which are mutually convertible by a classification matrix, because key words corresponding to such mutually convertible components of the input vector are considered to be mutually related. Accordingly, the division of mutually convertible components of input vector into some groups is considered to correspond to the classification of interests of the user.

First, matrix computation control section 1106 initializes the category label vector CatV stored in category label storage section 1108 at 0 vector (S1401). Next, 1, which is a value indicative of a first category is substituted for a category signal Cat (S1402). Prior to determining an input vector, an input vector CV stored in matrix calculation input storage section 1107 is initialized to 0 vector (S1403). The component counter i is set at 0 (S1404). It is determined whether or not the ith component CatV[i] of the category label vector CatV designated by the component counter i is equal to 0 (S1405). When the component is equal to 0, 1 is substituted for the i component CV[i] of the input vector CV (S1406). Thus, matrix calculation control section 1106 obtains an initial input vector with a single component being 1 and the other components being all 0.

By multiplying the input vector by the classification matrix signal Class, a conversion vector CVtmp is obtained (S1407). All components of the conversion vector CVtmp are subjected to the following conversion (S1408 to S1411):

$$Ctmp[i] = \Theta(Ctmp[i])$$

where $\Theta$ is a function represented as follows:

$$\Theta(X) = 1, X > 0$$

0, in the other cases.

The conversion vector CVtmp with the components being 1 or 0 is compared with the input vector CV (S1412). When the conversion vector CVtmp is different from the input vector CV, the conversion vector CVtmp is substituted for the input vector CV, and the processing is returned to step S1407 (S1415). When the conversion vector CVtmp is equal to the input vector CV, the category label vector CatV is changed as follows (S1413):

$$CatV = CatV + Cat \cdot CV$$

Then, the category signal Cat is increased by 1, and the processing is returned to step S1403.

When values of all components of the category label vector are not 0, a flow of the processing branches to the finish from step S1417.

According to the above-described processing, when the classification matrix signal Class, generated from the processed positive metric signal CMY and processed negative metric signal CMN, is composed of 4 independent matrixes, the category label vector CatV is changed, for example, as follows.

Initial state
CatV=(0,0,0,0,0,0,0,0,0,0,0,0,0,0,0)
Cat=1
CatV=(1,0,1,0,0,0,0,0,1,0,1,0,0,0,0)
Cat=2
CatV=(1,2,1,0,2,0,2,0,1,0,1,2,2,0,0)
Cat=3
CatV=(1,2,1,3,2,3,2,0,1,3,1,2,2,0,3)
Cat=4
CatV=(1,2,1,3,2,3,2,4,1,3,1,2,2,4,3)

Thus, by dividing mutually convertible components of the input vector into some groups, it is possible to classify interests of the user into some groups.

Next, using this result, the classification information filtering unit is set. When the category label vector CatV is obtained, matrix computation control section 1106 outputs a write start signal to classification metric write section 1109.

Figure 16:
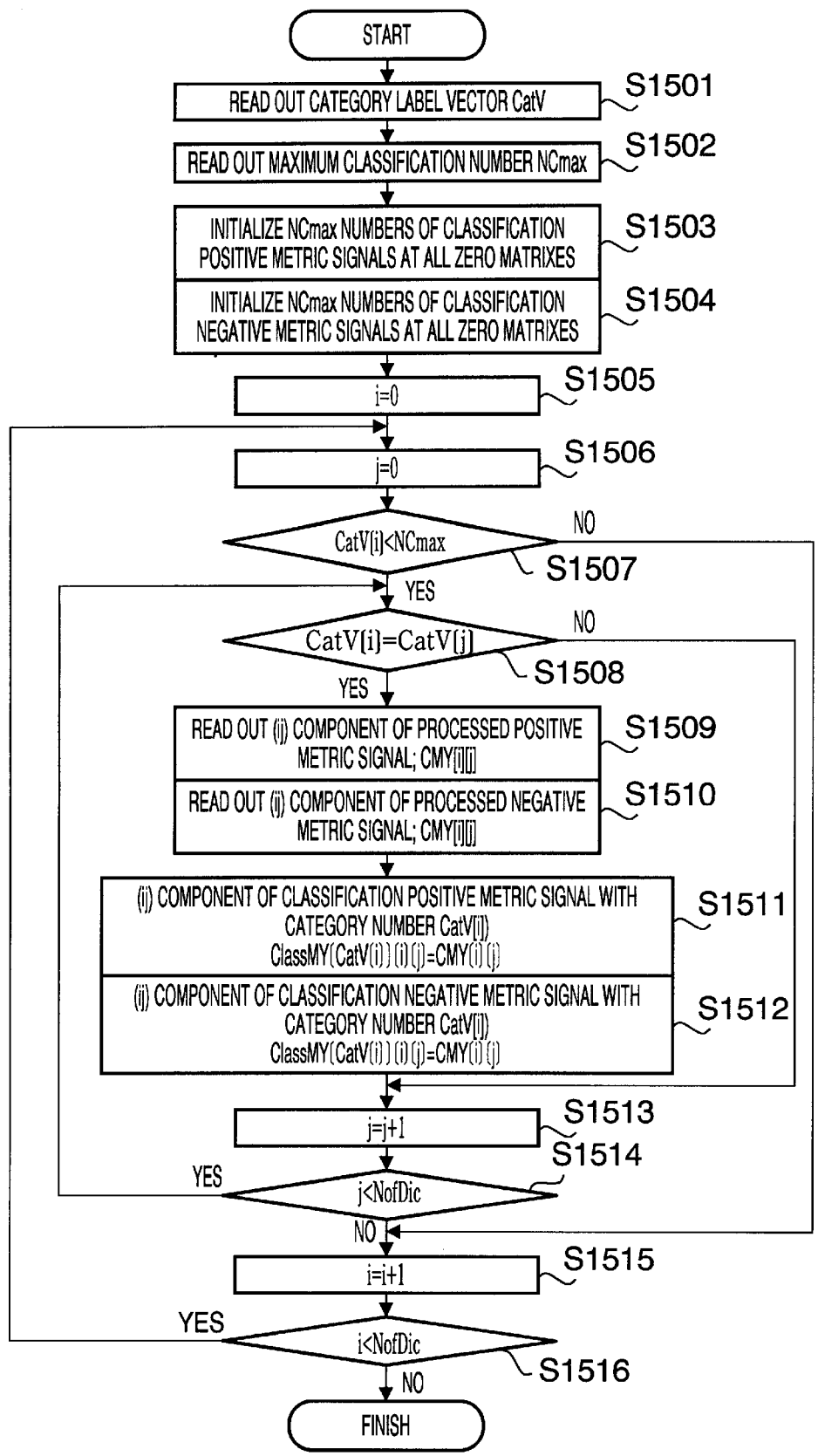
FIG. 16 is a flowchart to explain operations in a classification metric write section in the above embodiment.

Classification metric write section 1109 receives the write start signal, and then starts the processing illustrated in a flowchart in FIG. 16. An object of a series of this processing is to divide the processed positive metric signal CMY and processed negative metric signal CMN into the classification number equal to or less than the maximum classification number based on the category label vector respectively to write in classification positive metric storage section 31 and classification negative metric storage section 32 in the classification information filtering unit.

First, classification metric write section 1109 reads out the category label vector (S1501), and then reads out the maximum classification number NCmax from classification parameter storage section 36 (S1502). In the case of this embodiment illustrated in FIG. 2, since there are two classification filtering units (18-1 and 18-2), it is preferable to set the maximum classification number NCmax at 2 (NCmax=2).

Next, classification metric write section 1109 initializes all of classification positive metric signals ClassMY and classification negative metric signal ClassMN in NCmax numbers in classification information filtering units 18-1 to NCmax at zero matrixes (S1503 and S1504). The column counter i is set at 0 (S1505), and the row counter j is also set at 0 (S1505).

Then, it is decided whether or not the ith component CatV[i] of the category label vector is equal to or less than the maximum classification number NCmax (S1507). Classification metric write section 1109 goes to step S1508 when CatV[i] is less than NCmax, and goes to step S1515 when CatV[i] is more than NCmax.

At step S1508, with respect to the category label vector, the ith component CatV[i] is compared with the jth component CatV[j]. When the ith component CatV[i] is equal to the jth component CatV[j], the two components are mutually converted by the classification matrix Class, meaning that the two components are not independent. Therefore, CMY[i][j] that is the (ij) component of the processed positive metric signal CMY and CMN[i][j] that is the (ij) component of the processed negative metric signal CMN are read out (S1509 and S1510).

Then, the (ij) component of the filered positive metric signal is substituted for the (ij) component of classification positive metric signal ClassMY in classification information filtering unit 18-CatV[i] with the category number CatV[i], and the (ij) component of the processed negative metric signal is substituted for the (ij) component of classification negative metric signal ClassMN in classification information filtering unit 18-CatV[i] with the category number CatV[i] (S1511 and S1512).

On the other hand, at step S1508, when the two components are not equal, the two components are not mutually converted by the classification matrix Class, meaning that the two components are independent.

The row counter j is increased by 1 (S1513), and the value of the row counter j is compared with the dimension NofDiC of the category label vector (S1514). When the value of the row counter j is smaller than the dimension of the category label vector, the processing is returned to step S1508. When the value of the row counter j is greater than the dimension of the category label vector, the processing goes to step S1515.

At step S1515, the value of column counter i is increased by 1. The value of the column counter i is compared with the dimension NofDiC of the category label vector (S1516). When the value of the column counter i is smaller than the dimension of the category label vector, the processing is returned to step S1506. When the value of the column counter i is greater than the dimension of the category label vector, the processing is finished.

According to the above-described processing; classification information filtering units 18 are all appropriately set (including the case where the classification positive metric signal and classification negative metric signal are both zero matrixes).

Operations in each of classification information filtering units 18 are the same as information filtering unit 11, and therefore the explanation thereof is omitted.

In addition, as the calculation method of the determination parameter Q, the hill climbing method is adopted in this embodiment. However, the newton method, the two-way attack method, or the like may be adopted to obtain a determination plane parameter Q for optimizing the following cost function, which is composed based on a distance between the determination plane, the learning necessity signal LN and the learning reliability signal LR.

$$COST = \sum_{C} (2 \cdot T[c] -)(LSN[c] - Q \cdot LSY[c]) \quad (7)$$

Further, good results are obtained by using the following equations including effects of oblivion of learning as the positive metric signal MY and negative metric signal MN:

$$MY[i][j] = \alpha \cdot MY[i][j] + LV[i] \cdot LV[j]$$

$$MY[i][j] = \beta \cdot MY[i][j] + LV[i] \cdot LV[j]$$

where $\alpha$ and $\beta$ are positive numbers less than 1.

Furthermore, it is possible to configure an information filtering apparatus applicable to items which do not contain key words by providing a key word generating section which generates the key word group signal and the key word number signal from a document, as described in references such as "Technical Report of Information Processing Society, Natural Language Processing 101-8 (1994.5.27)".

With respect to an item with a title, it may be possible to set a word composing the title as a key word to generate the key word number signal and key word group signal.

In addition, it may be possible that the key word signal contains classification codes such as the international patent classification number without changing the configuration of the present invention, providing good results.

Further, the embodiment of the present invention illustrates the case where the unread data URD is presented one by one. However, depending on a scale of the display device (not shown), it may be easy to adopt a configuration where a plurality of unread data URD is concurrently displayed, and a reply of a user for each of the plurality of presented unread data can be provided to the information filtering apparatus.

Figure 1:
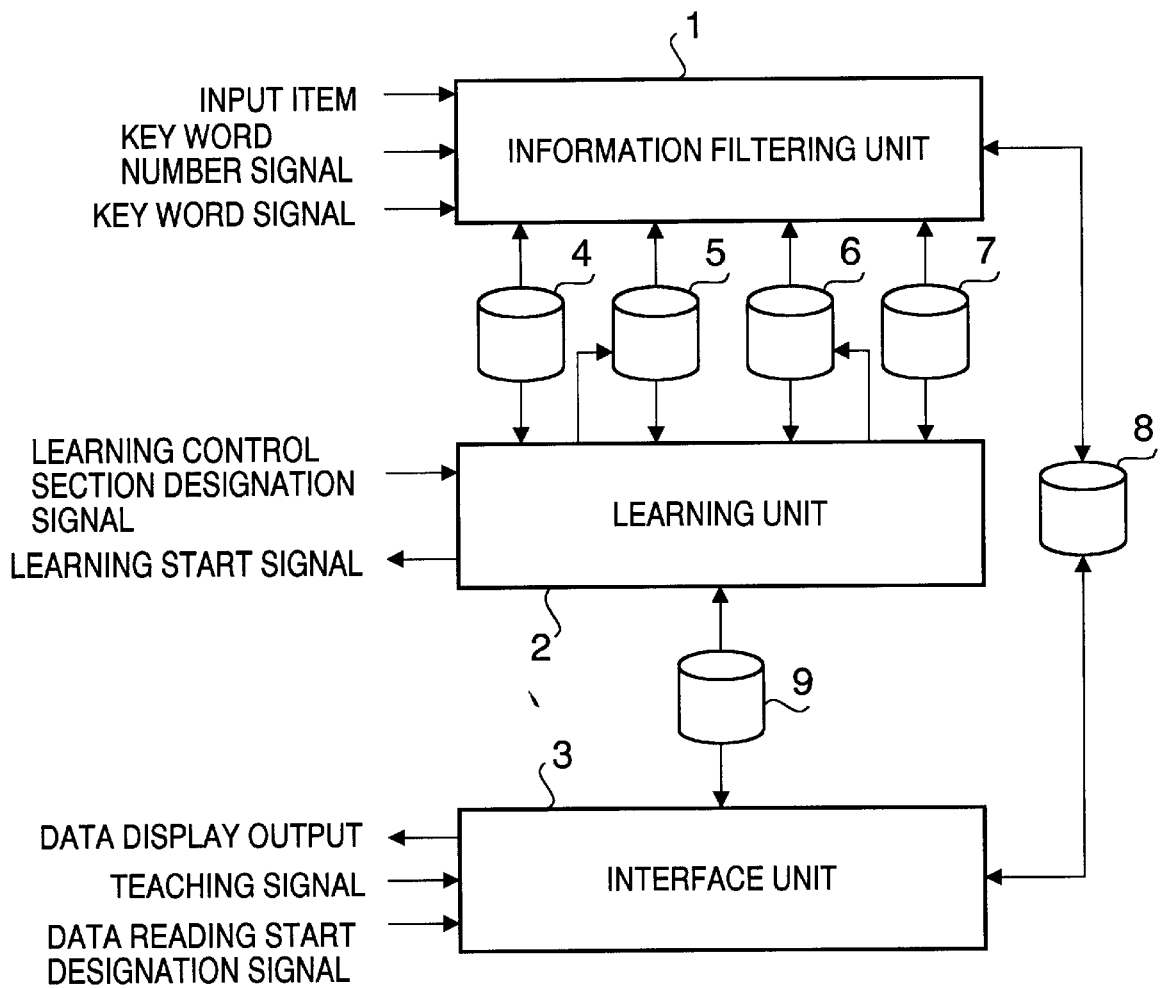
FIG. 1 is a block diagram of a conventional information filtering apparatus.
Figure 15:
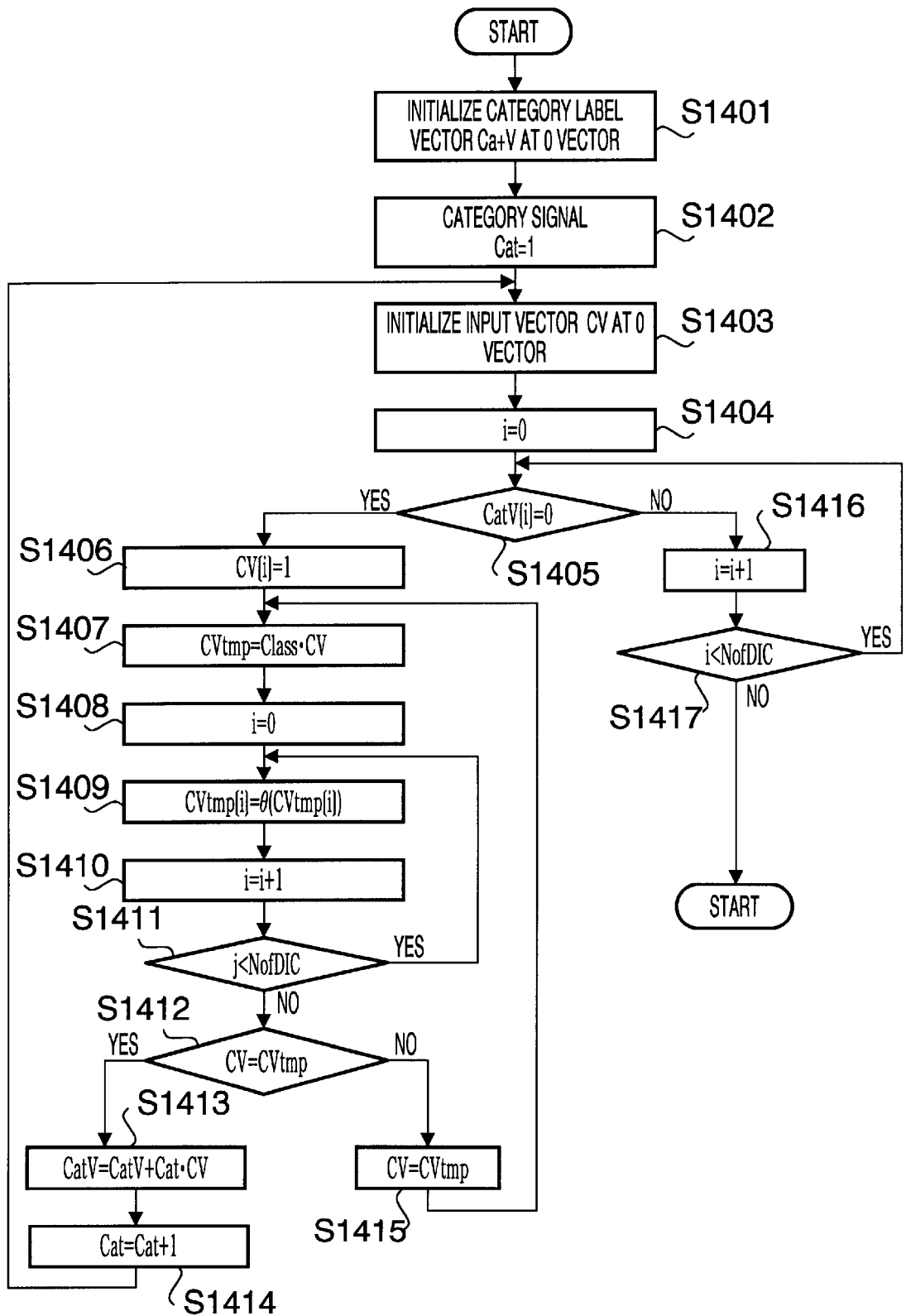
FIG. 15 is a flowchart to explain operations in a matrix calculation control section in the above embodiment.

As described above, in this embodiment, the concurrent appearance of key words is noticed, and the processing illustrated in the flowcharts in FIG. 15 and FIG. 1 is executed. Specifically, the positive metric signal MY and negative metric signal, in which the relation between a reply of a user and key words is reflected, are divided. Using the two metric signals subjected to the division, a plurality of necessities is calculated, reflecting the interests of the user, to be arranged in order of necessity. It is thereby possible to classify items, and to present classified items in order of necessary. In the conventional technology, the necessity provides only a single evaluation.

According to the information filtering apparatus in this embodiment of the present invention, by the learning based on the teaching signal from a user, the item that the user needs is classified, and the necessity signal thereof becomes a large value. As a result, the item of which the necessity for the user is high is preferentially presented in the interface unit such as a display device.

Further, in this embodiment, the explanation is performed conforming to the embodiment of an information filtering apparatus disclosed in Japanese Unexamined Patent Publication HEI9-288683. However, it may be easy to adopt the configuration conforming to the second embodiment of the information filtering apparatus disclosed in Japanese Unexamined Patent Publication HEI9-288683.

Furthermore, it may be easy to apply the present invention to a database restructuring apparatus disclosed in the third embodiment of an information filtering apparatus disclosed in Japanese Unexamined Patent Publication HEI9-288683, in order to compose a database restructuring apparatus which restructures a database, while classifying items.

As described above, the present invention provides the information filtering apparatus having the vector generating section which converts a plurality of key words contained in the item into a vector, the score calculating section which calculates a score using the vector and the teaching signal from a user, the necessity calculating section which calculates the necessity and reliability from the score, and the metric learning section which calculates a metric for use in calculating the score in the score calculating section based on a simple evaluation that the item is necessary or unnecessary provided from the user. Such an information filtering apparatus arranges the items according to the degree of the necessity for the user, and provides the item in descending order of necessity for the user, thereby facilitating the user to obtain the item of which the necessity for the user is high.

The present invention is not limited to the above described embodiments, and various variations and modifications may be possible without departing from the scope of the present invention.

This application is based on the Japanese Patent Application No. HEI10-312417 filed on Nov. 2, 1998, entire content of which is expressly incorporated by reference herein.

What is claimed is:

1. An information filtering apparatus comprising:

a metric storage in which a result of determination on whether a presented item is necessary or unnecessary is stored in the form of a metric signal calculated from a key word signal contained in the presented item;

metric dividing means for fetching the metric signal from said metric storage, and dividing the metric signal for each predicted field to generate a classification metric signal;

classification filtering means for rearranging an order of presenting input items which are input from a storage using a magnetic or optical medium, or an information communication network, using a divided metric signal; and presentation means for presenting items for each field according to the order rearranged in said classification filtering means.

2. A database restructuring apparatus for restructuring a database using the information filtering apparatus according to claim 1.

3. The information filtering apparatus according to claim 1, wherein the key word signal contains a classification code.

4. The information filtering apparatus according to claim 1, wherein said classification filtering means comprising:

vector converting means for converting a key word group signal composed of a plurality of key word signals contained in each of the input items into a vector signal using a dictionary in which a plurality of key word signals is stored;

score calculating means for calculating a score signal from said metric signal and the vector signal which is converted from said key word group signal; and order determining means for determining the order of presenting items including the input items and the other unread items based on a calculated score signal.

5. The information filtering apparatus according to claim 1, wherein said metric storage stores as metric signals a positive metric signal calculated from a key word signal contained in the presented item determined as necessary, and a negative metric signal calculated from a key word signal contained in the presented item determined as unnecessary.

6. The information filtering apparatus according to claim 5, wherein an (ij) component which is a component of the matrix of each of the positive metric signal and the negative metric signal is calculated from a frequency of the items determined as necessary, a frequency of the items determined as unnecessary, a frequency that items containing concurrently an ith key word signal and a jth key word signal are determined as necessary, and a frequency that items containing an ith key word signal and a jth key word signal are determined as unnecessary.

7. The information filtering apparatus according to claim 6, wherein (ij) components which are components of the matrixes of the positive metric signal and the negative metric signal are signals used to quantitatively evaluate a difference between a probability distribution indicating that the item is necessary or unnecessary and a probability distribution indicating that the item containing concurrently the ith key word signal and the jth key word signal is necessary or unnecessary.

8. The information filtering apparatus according to claim 1, wherein the positive metric signal is an auto-correlation matrix of the vector signal which is converted from a key word group signal composed of key word signals contained in a presented item determined as necessary, and the negative metric signal is an auto-correlation matrix of the vector signal which is converted from a key word group signal composed of key word signals contained in a presented item determined as unnecessary.

9. The information filtering apparatus according to claim 1, wherein said classification filtering means comprising:

vector converting means for converting a key word group signal composed of a plurality of key words signals contained in the input item into a vector signal using a dictionary in which a plurality of key word signals is stored;

means for calculating a positive score signal using said vector signal and a positive metric signal composed of a necessary item;

means for calculating a negative score signal using said vector signal and a negative metric signal composed of an unnecessary item;

necessity calculating means for calculating a determination parameter signal which is a coefficient of a straight line for separating a distribution of the input items on a two-dimensional plane with said positive metric signal and said negative metric signal into necessary items and unnecessary items, and further calculating a necessity signal and a reliability signal from said positive score signal and said negative score signal; and means for determining the order of presenting the input items corresponding to a level of said necessity signal.

10. The information filtering apparatus according to claim 1, further comprising:

a number storage for storing an all positive number indicative of the number of times that the presented item is determined as necessary, and an all negative number indicative of the number of times that the presented item is determined as unnecessary;

a correspondence table used in converting a character sequence indicative of a key word signal into a numerical character;

an adaptive dictionary storage for storing a positive number indicative of the number of times that the item containing said character sequence as the key word signal is determined as necessary and a negative number indicative of the number of times that the item containing said character sequence as the key word signal is determined as unnecessary; and dictionary learning means for updating said all positive number, said all negative number, and a signal stored in said adaptive dictionary storage using the result of determination on whether the presented item is necessary or unnecessary, the key word signal contained in said presented item, said all positive number, said all negative number, and the signal stored in said adaptive dictionary storage.

11. The information filtering apparatus according to claim 10, wherein an updated of a content of the dictionary is performed using a key word cost signal calculated from a frequency of items determined as necessary, a frequency of items determined as unnecessary, and with respect to each key word signal, a frequency of items containing said key word signal determined as necessary and a frequency of items containing said key word signal determined as unnecessary.

12. The information filtering apparatus according to claim 11, wherein the key word cost signal for each key word signal is a signal used to quantitatively evaluate a difference between a probability distribution indicating that the item is necessary or unnecessary and a probability distribution indicating that the item containing said key word is necessary or unnecessary.

13. The information filtering apparatus according to claim 12, wherein the key word signal having said key word cost signal with a large value is left, and the key word signal having said key word cost signal with a small value is discarded, a value of said key word cost signal for each key word signal being increased as the difference between the probability distribution indicating that the item is necessary or unnecessary and the probability distribution indicating that the item containing said key word signal is necessary or unnecessary is increased.

14. An information filtering method comprising the steps of:

dividing a metric signal for each predicted field to generate a classification metric signal, said metric signal being calculated from a key word signal contained in a presented item to indicate a result of determination on whether the presented item is necessary or unnecessary;

rearranging an order of presenting input items which are input from a storage using a magnetic or optical medium, or an information communication network, using a divided metric signal; and presenting items for each field according to a rearranged order.

15. The information filtering method according to claim 13, further comprising the steps of:

converting a key word group signal composed of a plurality of key word signals into a vector signal using a dictionary;

calculating a score signal from the vector signal and said metric signal; and changing the order of presenting items using a calculated score signal.

16. The information filtering method according to claim 15, wherein metric signals are a positive metric signal composed of an item obtained in the case where a signal, which is input from an input terminal, is necessary and a negative metric signal composed of an item obtained in the case where a signal, which is input from the input terminal, is unnecessary.

17. A data base restructuring method of restructuring a database using the information filtering method according to claim 14.

* * * * *